US009354346B2

(12) United States Patent
Vu et al.

(10) Patent No.: US 9,354,346 B2
(45) Date of Patent: May 31, 2016

(54) ACOUSTIC SOURCE FOR GENERATING AN ACOUSTIC BEAM

(71) Applicants: Chevron U.S.A. Inc., San Ramon, CA (US); LOS ALAMOS NATIONAL SECURITY, LLC, Los Alamos, NM (US)

(72) Inventors: Cung Khac Vu, Houston, TX (US); Dipen N. Sinha, Los Alamos, NM (US); Cristian Pantea, Los Alamos, NM (US)

(73) Assignees: LOS ALAMOS NATIONAL SECURITY, LLC, Los Alamos, NM (US); CHEVRON U.S.A. INC., San Ramon, CA (US)

( * ) Notice: Subject to any disclaimer, the term of this patent is extended or adjusted under 35 U.S.C. 154(b) by 606 days.

(21) Appl. No.: 13/836,718

(22) Filed: Mar. 15, 2013

(65) Prior Publication Data

US 2014/0056110 A1    Feb. 27, 2014

Related U.S. Application Data

(60) Provisional application No. 61/691,602, filed on Aug. 21, 2012.

(51) Int. Cl.
| | |
|---|---|
| G01V 1/00 | (2006.01) |
| B06B 1/00 | (2006.01) |
| G01V 1/50 | (2006.01) |
| E21B 47/00 | (2012.01) |
| G01V 1/42 | (2006.01) |

(Continued)

(52) U.S. Cl.
CPC .............. *G01V 1/50* (2013.01); *E21B 47/0005* (2013.01); *G01V 1/42* (2013.01); *B06B 1/0688* (2013.01); *H04R 17/00* (2013.01)

(58) Field of Classification Search
USPC ......................................................... 367/166
See application file for complete search history.

(56) References Cited

U.S. PATENT DOCUMENTS

| | | |
|---|---|---|
| 3,302,745 A | 2/1967 | Ikrath |
| 3,732,945 A | 5/1973 | Lavigne |
| 3,872,421 A | 3/1975 | Rogers et al. |

(Continued)

FOREIGN PATENT DOCUMENTS

| | | |
|---|---|---|
| EP | 0 599 250 A2 | 6/1994 |
| EP | 1122558 A | 8/2001 |

(Continued)

OTHER PUBLICATIONS

International Serach Report for PCT International Patent Application No. PCT/US2013/056040, mailed May 6, 2014.

(Continued)

*Primary Examiner* — James Hulka
(74) *Attorney, Agent, or Firm* — Pillsbury Winthrop Shaw Pittman, LLP

(57) ABSTRACT

An acoustic source for generating an acoustic beam includes a housing; a plurality of spaced apart piezo-electric layers disposed within the housing; and a non-linear medium filling between the plurality of layers. Each of the plurality of piezo-electric layers is configured to generate an acoustic wave. The non-linear medium and the plurality of piezo-electric material layers have a matching impedance so as to enhance a transmission of the acoustic wave generated by each of plurality of layers through the remaining plurality of layers.

15 Claims, 16 Drawing Sheets

(51) Int. Cl.
*B06B 1/06* (2006.01)
*H04R 17/00* (2006.01)

(56) References Cited

U.S. PATENT DOCUMENTS

| | | | |
|---|---|---|---|
| 3,974,476 A | 8/1976 | Cowles | |
| 4,253,166 A | 2/1981 | Johnson | |
| 4,382,290 A | 5/1983 | Havira | |
| 4,480,324 A | 10/1984 | Sternberg | |
| 4,509,149 A | 4/1985 | Ruehle | |
| 4,646,565 A | 3/1987 | Siegfried | |
| 4,757,873 A | 7/1988 | Linyaev et al. | |
| 4,797,859 A | 1/1989 | Hornby | |
| 4,805,873 A | 2/1989 | Mouton | |
| 4,817,059 A | 3/1989 | Hornby et al. | |
| 4,831,600 A | 5/1989 | Hornby et al. | |
| 5,081,611 A | 1/1992 | Hornby | |
| 5,144,590 A | 9/1992 | Chon | |
| 5,521,882 A | 5/1996 | D'Angelo et al. | |
| 5,544,127 A | 8/1996 | Winkler | |
| 5,640,371 A * | 6/1997 | Schmidt | B06B 1/0633 367/153 |
| 5,719,823 A | 2/1998 | Earp | |
| 6,009,043 A | 12/1999 | Chon et al. | |
| 6,041,125 A | 3/2000 | Nishimura et al. | |
| 6,175,536 B1 | 1/2001 | Khan | |
| 6,216,540 B1 | 4/2001 | Nelson et al. | |
| 6,440,075 B1 | 8/2002 | Averkiou | |
| 6,597,632 B2 | 7/2003 | Khan | |
| 6,631,783 B2 | 10/2003 | Khan | |
| 6,671,224 B1 * | 12/2003 | Pabon | G10K 11/1788 166/254.2 |
| 6,704,247 B1 | 3/2004 | Ruffa | |
| 6,734,604 B2 * | 5/2004 | Butler | H04R 17/00 310/334 |
| 6,768,702 B2 * | 7/2004 | Brown | B06B 1/0633 367/138 |
| 6,937,938 B2 | 8/2005 | Sansone | |
| 7,059,404 B2 | 6/2006 | Flecker et al. | |
| 7,301,852 B2 | 11/2007 | Leggett, III et al. | |
| 7,310,580 B2 | 12/2007 | Zhou et al. | |
| 7,460,435 B2 | 12/2008 | Garcia-Osuna | |
| 7,463,551 B2 | 12/2008 | Leggett, III et al. | |
| 7,762,354 B2 | 7/2010 | Garcia-Osuna | |
| 7,764,572 B2 | 7/2010 | Wu et al. | |
| 8,116,167 B2 | 2/2012 | Johnson et al. | |
| 9,121,970 B2 | 9/2015 | Mickael | |
| 2002/0159336 A1 * | 10/2002 | Brown | B06B 1/0633 367/138 |
| 2003/0011282 A1 | 1/2003 | Kishimoto | |
| 2003/0151975 A1 | 8/2003 | Zhou et al. | |
| 2003/0227826 A1 * | 12/2003 | Butler | H04R 17/00 367/164 |
| 2004/0020646 A1 | 2/2004 | Flecker et al. | |
| 2004/0044479 A1 | 3/2004 | Sansone | |
| 2005/0036403 A1 | 2/2005 | Leggett, III et al. | |
| 2005/0152219 A1 | 7/2005 | Garcia-Osuna | |
| 2006/0120217 A1 | 6/2006 | Wu et al. | |
| 2009/0310441 A1 | 12/2009 | Johnson et al. | |
| 2010/0002540 A1 | 1/2010 | Vu et al. | |
| 2011/0051556 A1 | 3/2011 | Mickael | |
| 2011/0062824 A1 * | 3/2011 | Wada | 310/334 |
| 2011/0080803 A1 | 4/2011 | Vu et al. | |
| 2014/0056101 A1 * | 2/2014 | Vu et al. | 367/35 |
| 2014/0056110 A1 | 2/2014 | Vu et al. | |
| 2014/0056111 A1 * | 2/2014 | Vu et al. | 367/180 |

FOREIGN PATENT DOCUMENTS

| | | |
|---|---|---|
| GB | 2168568 | 6/1986 |
| GB | 2 288 021 | 10/1995 |
| GB | 2 399 411 | 9/2004 |
| GB | 2404983 A | 2/2005 |
| GB | 2444832 | 6/2008 |
| SU | 913303 | 3/1982 |
| WO | WO 02/04985 A2 | 1/2002 |
| WO | WO 2007/030016 | 3/2007 |
| WO | WO 2008/094050 A2 | 8/2008 |

OTHER PUBLICATIONS

Peter J. Westervelt; "Parametric Acoustic Array", The Journal of the Acoustical Society of America, vol. 35, No. 4, Apr. 1963, pp. 535-537.

International Search Report and Written Opinion for PCT International Patent Application No. PCT/US2009/047934, mailed Jan. 12, 2009.

Johnson et al. "Nonlinear Generation of Elastic waves in Crystalline Rock", Journal of Geophysical Research, vol. 92, No. B5, pp. 3597-3602, Apr. 10, 1987.

International Search Report and Written Opinion for PCT International Patent Application No. PCT/US2009/047184, mailed Dec. 21, 2009.

International Preliminary Report on Patentability for PCT International Patent Application No. PCT/US2009/047184, mailed Dec. 23, 2010.

International Search Report and Written Opinion for PCT International Patent Application No. PCT/US2010/031485, mailed Aug. 2, 2010.

International Search Report and Written Opinion for PCT International Patent Application No. PCT/US2010/031490, mailed Sep. 14, 2010.

Aas et al.; 3-D Acoustic Scanner, SPE, Society of Petroleum Engineers, Sep. 23-26, 1990, pp. 725-732.

Ostrovsky. L.A., and Johnson, P.A., "Dynamic Nonlinear Elasticity in Geomaterials", Rivista del Nuovo Cimento, vol. 24, No. 7., 2001.

Johnson, Paul A., and Shankland, Thomas J., "Nonlinear Generation of Elastic Waves in Granite and Sandstone; Continuous Wave and Travel Time Observations", Journal of Geophysical Research, vol. 94, No. B12, 1989, pp. 17,729-17,733.

Jones, G.L. and Kobett, D.R., "Interaction of Elastic Waves in an Isotropic Solid", The Journal of the Acoustical Society of America, vol. 35, No. 1, 1963, pp. 5-10.

Rollins, F.R., Taylor, L.H. and Todd, P.H., "Ultrasonic Study of Three-Phonon Interactions. II. Experimental Results", Physical Review, vol. 136, No. 3A, 1964, pp. 597-601.

Korneev, Valeri A., Nihei, Kurt T. and Myer, Larry R., "Nonlinear Interaction of Plane Elastic Waves", Lawrence Berkeley National Laboratory Report LBNL-41914, 1998.

International Preliminary Report on Patentability for PCT International Patent Application No. PCT/US2010/031490, mailed Oct. 27, 2011.

International Preliminary Report on Patentability for PCT International Patent Application No. PCT/US2010/031485, mailed Oct. 27, 2011.

Tserkovnyak et al.; "Non-linear tube waves in permeable formations: Difference frequency generation", Journal of the Acoustical Society of America, Jul. 1, 2004, vol. 116, Issue 1, pp. 209-216.

Singapore Office Action for Appln. No. 201009640-2, mailed Dec. 2, 2011.

PCT International Search Report and Written Opinion for PCT International Patent Application No. PCT/US2011/035608, mailed Dec. 22, 2011.

PCT International Search Report and Written Opinion for PCT International Patent Application No. PCT/US2011/035595, mailed Dec. 27, 2011.

PCT International Search Report and Written Opinion for PCT International Patent Application No. PCT/US2011/035358, mailed Dec. 29, 2011.

International Preliminary Report on Patentability for PCT International Patent Application No. PCT/US2009/047934, mailed Jan. 13, 2011.

International Preliminary Report on Patentability for PCT International Patent Application No. PCT/US2009/047184, mailed Dec. 14, 2010.

International Preliminary Report on Patentability for PCT International Patent Application No. PCT/US2009/047934, mailed Dec. 1, 2009.

(56) References Cited

OTHER PUBLICATIONS

International Serach Report for PCT International Patent Application No. PCT/US2013/056042, mailed May 6, 2014.
International Search Report for PCT/US2013/056042.
US office Action dated Nov. 16, 2015 for U.S. Appl. No. 13/836,386.
Singapore Office Action dated Nov. 30, 2015 for Appln. No. 11201501252W.
International Preliminary Report on Patentability for Application No. PCT/US2013/056038, mailed Dec. 3, 2014.
U.S. Office Action dated Nov. 3, 2014 for U.S. Appl. No. 13/836,611.
International Serach Report for PCT International Patent Application No. PCT/US2013/056038, mailed May 6, 2014.
International Preliminary Report on Patentability dated Feb. 24, 2015 for Application No. PCT/US2013/056040.
U.S. Office Action dated Mar. 4, 2016 for U.S. Appl. No. 13/836,386.

* cited by examiner

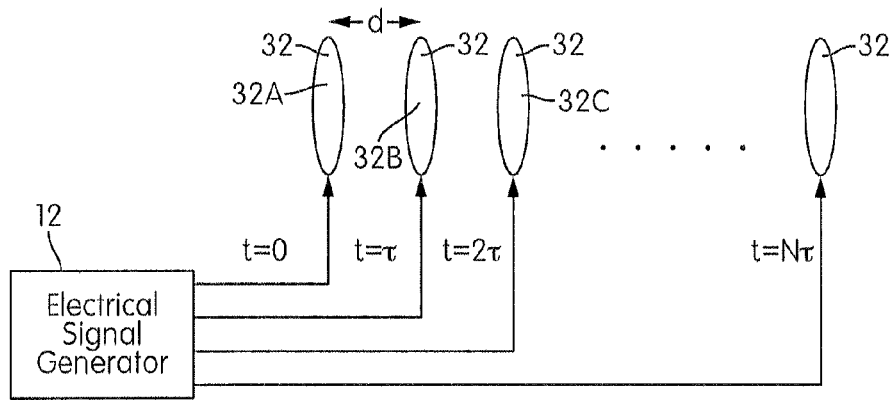
FIG. 1D
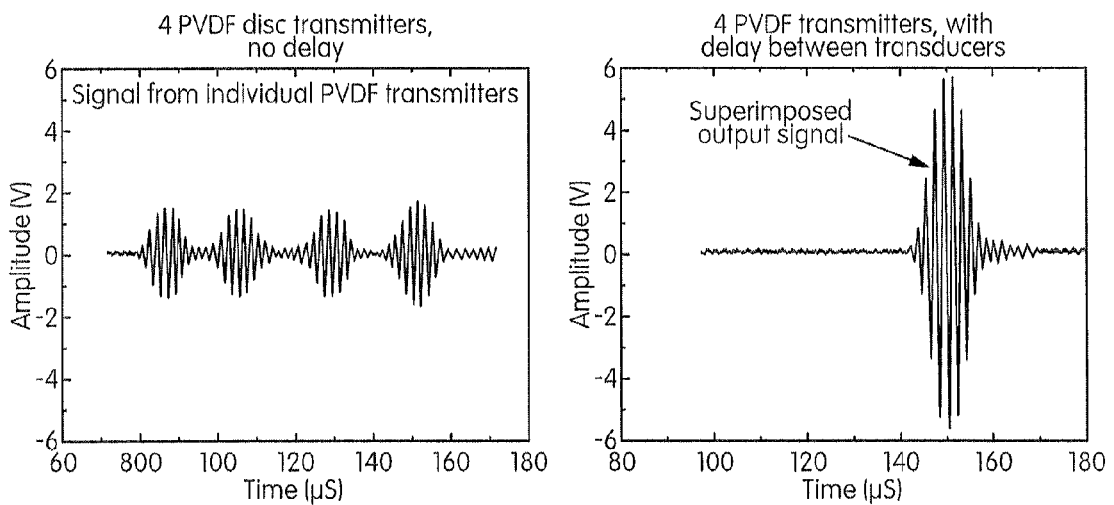
FIG. 1E
FIG. 1F

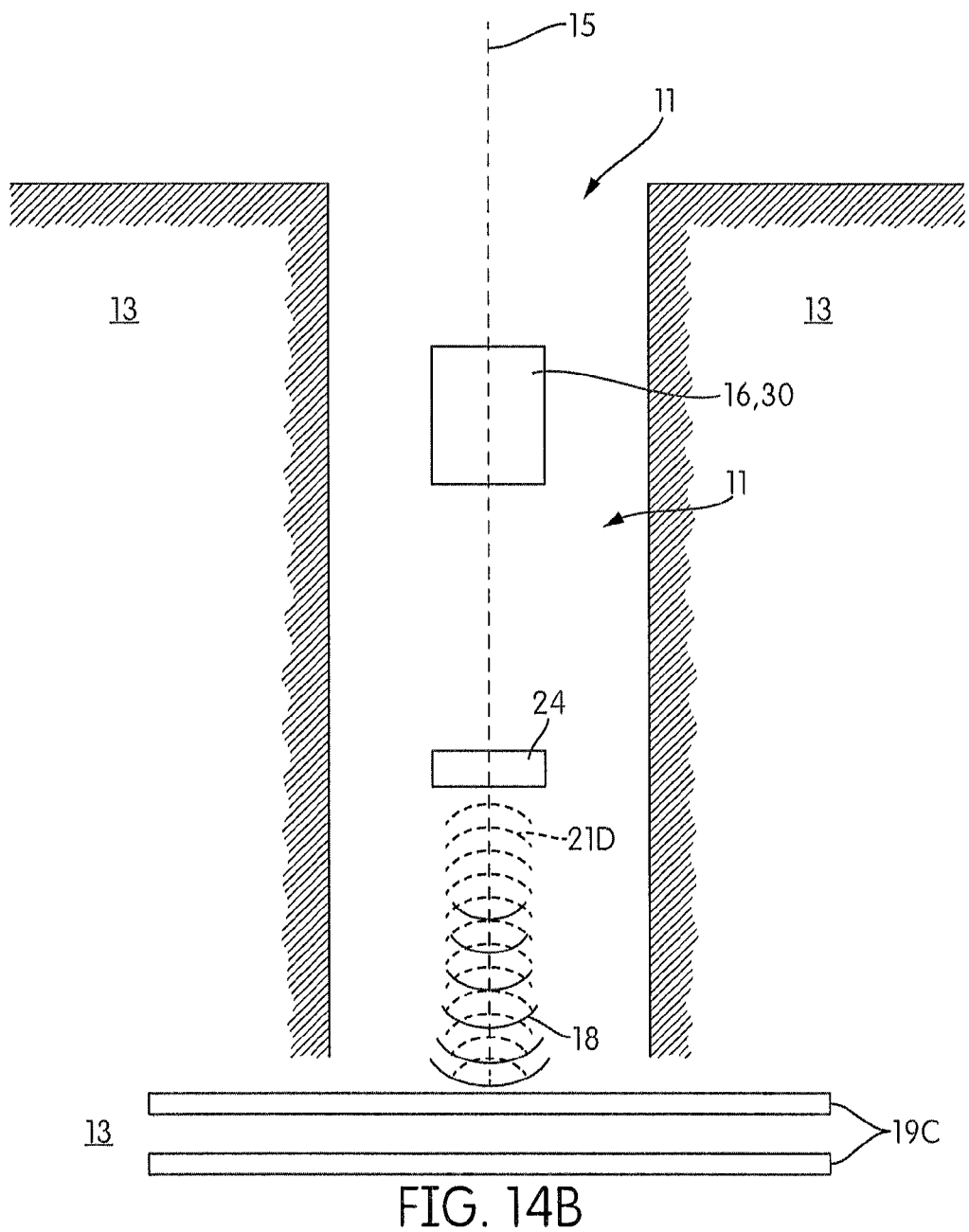

ACOUSTIC SOURCE FOR GENERATING AN ACOUSTIC BEAM

CROSS REFERENCE TO RELATED APPLICATION

The present application is based on and claims priority to U.S. Provisional Application No. 61/691,602, filed on Aug. 21, 2012, the entire content of which is incorporated herein by reference.

GOVERNMENT RIGHTS

This invention was made with Government support under Cooperative Research and Development Agreement (CRADA) Contract Number DE-AC52-06NA25396 awarded by the United States Department of Energy. The Government may have certain rights in this invention.

FIELD

The present invention relates generally to acoustic interrogation of rock formations around a borehole, and more particularly to using the combination of an acoustic source including a single or an array of transducers in the wellbore coupled to a linear or non-linear material for producing an acoustic beam as a probing tool from a borehole to interrogate the properties of rock formations and materials surrounding the borehole.

BACKGROUND

Acoustic interrogation of subsurface features tends to be limited by the frequency bandwidth of practical sources. High frequency signals have a relatively short penetration distance, while low frequency signals do not have collimation and generate unwanted signals within the well bore. It is difficult to generate a collimated acoustic beam signal in the sonic frequency range between about 15 kHz and about 120 kHz from the borehole to probe the rock formation surrounding a borehole with conventional transducers. Conventional sonic acoustic sources have large beam spread, such that as the frequency decreases, the beam spread increases. The beam spread also depends on the diameter of the transducer, which is limited by the borehole dimension. Sharp directivity steering for a particular frequency requires a number of conditions to be satisfied, including a long source array, uniform coupling of all the transducers to the rock formation around the borehole and knowledge of the acoustic velocities of the rock formation. In the borehole environment, these conditions are not often achievable because of underlying physics constraints, engineering feasibility or operating conditions, especially when the source signal has broad frequency bandwidth.

Traditional monopole and dipole borehole acoustic logs have been used to measure sonic velocity near the borehole using frequency range less than about 8 kHz. However, at this relatively low frequency, azimuthal resolution is relatively low. There are a number of patents that attempted to overcome this deficiency by using additional receivers to detect the direction of the signals returning to the receivers (see, for example, U.S. Pat. No. 5,544,127 and references cited within)). Applications for borehole sonic for reflection imaging, refraction imaging, fractures detection and permeability determination have also been proposed (see, for example, U.S. Pat. Nos. 5,081,611, 4,831,600, 4,817,059, and 4,797,859). All of these conventional techniques have operational and azimuthal resolution deficiency as the source lacks or has insufficient azimuthal directivity and desired frequency bandwidth.

For cement evaluation, ultrasonic waves in the frequency range of hundreds of kilohertz (e.g., low ultrasonic frequency range between 80 kHz and about 120 kHz and ultrasonic frequency range around about 200 kHz) have been used to detect a cement gap behind the casing. Even though frequencies around 200 kHz allow for good azimuth resolution, the distance range for detection at around this frequency is very limited, i.e., the depth of penetration to investigate behind the formation and channels between cement and rock formation is limited for ultrasonic source at frequency around 200 kHz. Conventional cement evaluation logs use a frequency of 30 kHz and can investigate deeper. However, these conventional cement evaluation logs lack azimuthal resolution because the wavelength is around the borehole radius and, consequently, the borehole modes would excite the entire borehole. As a result it is difficult to extract detailed azimuthal information of the cement bonding. In order to overcome this deficiency, multiple sources (emitting in the frequency range between 70 kHz and 120 kHz) and multiple receivers are used in a Sector Bond Tool (SBT) system. However, even with the use of multiple sources and multiple receivers, the conventional SBT system was not able to cure the deficiencies of the prior conventional cement evaluation logs as the source still lacked azimuthal directivity to effectively detect the existence of small channels between the cement and the rock formation.

SUMMARY

An aspect of the present invention is to provide a method for investigating cement bonding or rock formation structure near a borehole. The method includes generating an acoustic wave by an acoustic source; directing at one or more inclination and azimuthal angles the acoustic wave towards a target location in a vicinity of a borehole; receiving at one or more receivers an acoustic signal, the acoustic signal originating from a reflection or a refraction or surface wave propagation of the acoustic wave by a material at the desired location; and analyzing the received acoustic signal to characterize features of the material around the borehole.

Another aspect of the present invention is to provide a system for investigating cement bonding or rock formation structure near a borehole. The system includes an acoustic source configured to generate an acoustic wave and to direct the acoustic wave at one or more azimuthal angles towards a desired location in a vicinity of a borehole. The system also includes one or more receivers configured to receive an acoustic signal, the acoustic signal originating from a reflection or a refraction or surface wave propagation of the acoustic wave by a material at the desired location. The system also includes a processor configured to perform data processing on the received signal to analyze the received acoustic signal to characterize features of the material around the borehole.

Yet another aspect of the present invention is to provide an acoustic source for generating an acoustic beam. The acoustic source includes a housing; a plurality of spaced apart piezoelectric layers disposed with the housing; and a non-linear medium filling between the plurality of layers. Each of the plurality of piezoelectric layers is configured to generate an acoustic wave when excited with an electrical signal. The non-linear medium and the plurality of piezo-electric material layers have an acoustic matching impedance so as to enhance a transmission of the acoustic wave generated by each of plurality of layers through the remaining plurality of layers.

Another aspect of the present invention is to provide an acoustic detector that includes a cylindrical support member and a plurality of receiver elements that are disposed on a surface of the cylindrical support member. The plurality of receiver elements are configured to detect acoustic waves in a plurality of azimuthal angular directions.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 1C and 1D show a schematic diagram of an end-fire array of polyvinylidene difluoride (PVDF) film acoustic source used for generating a collimated acoustic beam, according to an embodiment of the present invention;

FIGS. 1E and 1F depict the signal output by the end-fire array of PVDF film acoustic source without applying a delaying to an excitation electrical signal and when applying an appropriate delay to the excitation electrical signal;

FIG. 10A is a longitudinal schematic view of the experimental setup and FIG. 10B is a top view of the experimental setup;

FIG. 14B depicts the acoustic measurement system disposed within a borehole, according to another embodiment of the present invention;

DETAILED DESCRIPTION

Figure 1A:
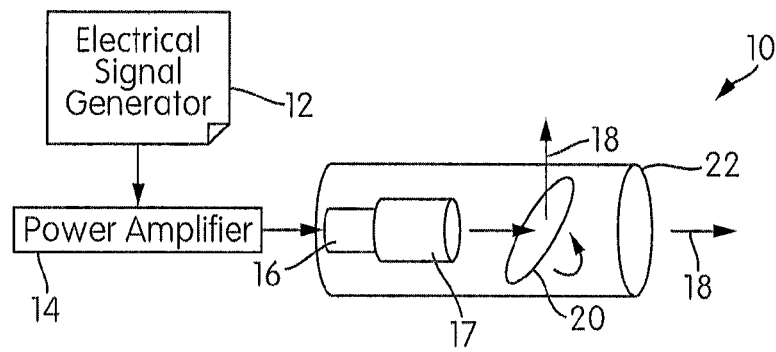
FIGS. 1A and 1B show a schematic diagram of a system for generating a collimated acoustic beam for characterizing formations and/or materials near a borehole, according to an embodiment of the present invention.
Figure 1B:
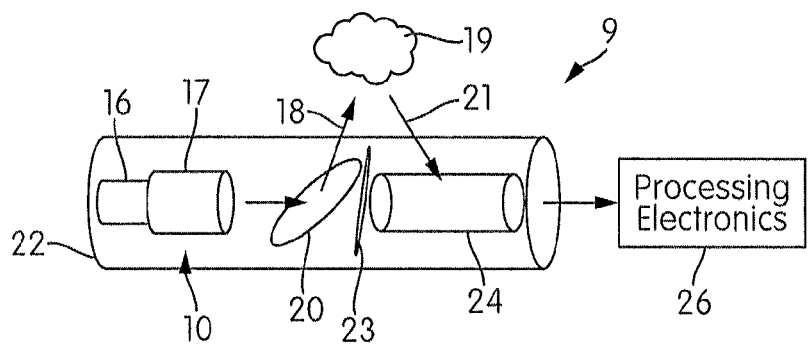

FIGS. 1A and 1B is a schematic diagram of a system for generating a collimated acoustic beam for characterizing formations and/or materials near a borehole, according to an embodiment of the present invention. The system 10 includes one or more electrical signal generators 12 configured to generate signals at a first frequency and a second frequency. The signals are transmitted to a signal amplifier or amplifiers 14 that are configured to increase the power of the signals. The signals modified by the amplifier 14 are transmitted to one or more transducers 16 that are configured to generate acoustic waves at the first and the second frequency. The acoustic waves are transmitted to a non-linear material 17, which mixes the waves at the first frequency and the second frequency by way of wave mixing process to produce a collimated acoustic beam 18 at a third frequency. In one embodiment, the collimated acoustic beam 18 can have a frequency in the range between about 15 kHz and about 120 kHz. This frequency range can be increased by using, for example, different transducers and primary frequencies. The collimated acoustic beam 18 can be a continuous acoustic signal or may also comprise one or more acoustic pulses (e.g., a train of acoustic pulses).

The non-linear material 17 can be a liquid, a mixture of liquids, a solid, a granular material embedded in a solid casing, embedded microspheres, acoustic meta-materials, or an emulsion. By way of a non-limiting example of such a non-linear material is Fluorinert FC-43. Fluorinert is selected for its relatively low sound velocity (646 m/s) and high acoustic nonlinearity ($\beta\sim7.6$). Depending on the operating conditions in the borehole, other non-linear materials can be used as a non-linear mixing medium with suitable low sound velocity, high non-linear coupling, absorption length, shock wave length, temperature and pressure operating ranges, as well as, other requirements required by operability specifications. Moreover, the length of the non-linear material can be very compact and can range from between 5 cm to 2 meters for the frequency range between approximately 15 kHz and approximately 120 kHz depending on the type of materials being used. The non-linear material can be disposed in a housing, such as for example a cylindrical container. The axis of the non-linear material-filled housing can be aligned with a borehole axis, such that the difference frequency acoustic beam that is output by the non-linear material propagates along this axis.

The non-linear behavior may be characterized through the analysis of the properties of P-waves resulting from the non-linear mixing phenomenon in which two incident waves at two different frequencies, $f_1$ and $f_2$, mix to generate third frequency components at the harmonics and inter-modulation frequencies $f_2-f_1$, $f_2+f_1$, $2f_1$ and $2f_2$, etc. In an aspect of the invention, the non-linear collinear mixing phenomenon is designed to occur in the non-linear material inside the wellbore. In general, only the resulting third wave of difference frequency $f_2-f_1$ is of interest to this application. The higher frequencies only propagate a short distance and tend to be absorbed in the non-linear material itself. In some embodiments, the third wave or collimated beam has a frequency between approximately 15 kHz and approximately 120 kHz. However, a wider frequency range and higher frequencies are also within the scope of the present invention. In one embodiment, the frequency bandwidth of the third wave is determined by the two primary frequencies $f_1$ and $f_2$ where one frequency (e.g., frequency $f_1$) is kept fixed and the other frequency (e.g., frequency $f_2$) is swept in time very rapidly (e.g., chirped). Hence, for example, by mixing a tone-burst of a few cycles of high frequency (e.g. frequency $f_1$) with a frequency chirp around that frequency $f_1$ one can obtain a broadband signal. However, it is also possible to mix a variety of signals to create a desired time response as well as a frequency response. For example, the compact parametric array source can be programmed to generate Gaussian pulse with frequency range between approximately 15 kHz and approximately 120 kHz by mixing two high frequency Gaussian pulses in the Fluorinert-filled chamber. The resultant generated beam pulse at frequency $f_2-f_1$ acts like an acoustic particle (analogous to phonon in solid state physics) traveling in the propagating medium. The sharp pulse feature allows measurement with raw data without any kind of signal processing, such as cross-correlation and this speeds up the measurement significantly. The experimental measurement system for the evaluation of this parametric array source for imaging features around a borehole casing is described in the next paragraph.

Figure 1C:
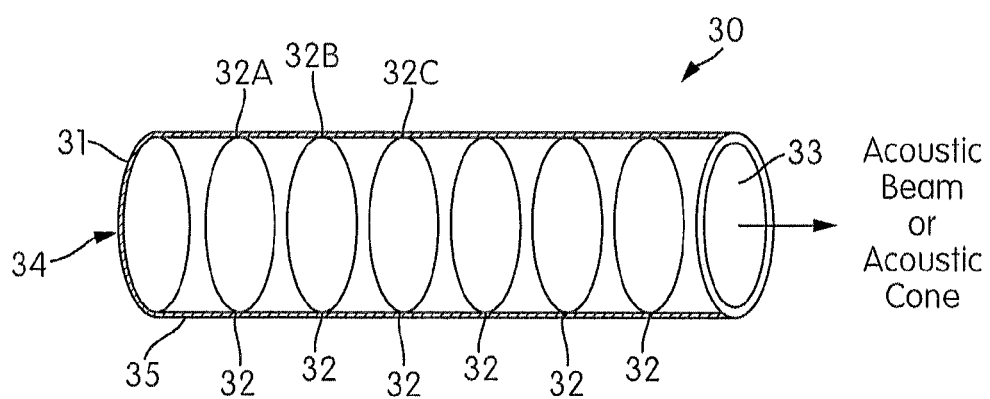

In one embodiment, the transducer 16 and mixing material 17 can be replaced by an end-fire array of polyvinylidene difluoride (PVDF) film acoustic source 30 shown in FIG. 1C. The end-fire of PVDF film acoustic source 30 comprises a plurality of spaced apart piezo-electric (PZT) layers (e.g., PVDF films) 32. PVDF provides some immediate benefits over piezoceramics. PVDF has high mechanical damping and a complex permittivity. Transducers constructed with PVDF can therefore have very broad bandwidth, producing a pressure wave of short duration, thus offering good spatial imaging resolution at lower operating (and hence minimally attenuating) center frequencies than piezoceramics. Additionally, the acoustic impedance (Z) of PVDF (Measurement Specialties, Norristown, Pa.) is approximately 2.7 MRayls relative to the acoustic impedance of water which is equal to approximately 1.48 MRayls. When using PZT layers, the non-linear mixing material or medium 17 may be removed and substituted with any fluid that has good transmission properties at the desired operating frequency range (e.g., between approximately 1 kHz and approximately 120 kHz) and low acoustic absorption. The PVDF films 32 can be mounted inside a housing 34 (e.g., a cylinder). Although the end-fire array acoustic source 30 is described herein as using PVDF films, as it can be appreciated, other piezo-electric films can be used. Although, the housing 34 is depicted in FIG. 1C as having a cylindrical shape with a circular base, the housing 34 can have a cylindrical shape or configuration with any base-shape (e.g., a polygonal base-shape). The acoustic source further includes a non-linear medium filling between the piezo-electric layers (e.g., PVDF films). In one embodiment, the housing 34 is filled a medium such as a fluid having an acoustic impedance substantially matching the acoustic impedance of the PVDF film 32. In one embodiment, the fluid can be, for example, water as the acoustic impedance of the PVDF film 32 substantially matches the acoustic impedance of water. In another embodiment, water can be replaced by Fluorinert (e.g., FC-43). The impedance mismatch between PVDF and Fluorinert changes just slightly but the sound speed in the liquid becomes significantly lower, that is 640 m/s in FC-43 as compared to 1480 m/s for water. However, Fluorinert FC-43 decomposes at elevated temperatures, over 390° F. The use of Fluorinert allows the size of the source to be decreased by almost one third as compared to the size when using water because the acoustic speed in Fluorinert is lower. In one embodiment, the end-fire array source 30 further includes acoustic absorber material 31 disposed at a first end of the housing 34 and a plate 33 disposed at a second end of the housing 34 opposite the first end. On one embodiment, the plate 33 can be made into an acoustic lens to provide manipulation of the acoustic beam collimation or focusing, etc. The PVDF films provide a very broadband source of sound from 1 kHz to 100 MHz. In addition, in one embodiment, a lateral wall of the housing 34 can be layered with acoustic insulation 35 to prevent the acoustic waves generated by the PVDF films from reflecting from the lateral wall.

The end-fire array based on PVDF film acoustic source 30 is capable of outputting a more powerful acoustic wave (which can be, for example, in a form of cone or a collimated or parallel beam) than a conventional parametric array using a single transducer. Each of the plurality of piezoelectric layers (e.g., PVDF films) is configured to generate an acoustic wave. The non-linear medium and the plurality of piezo-electric layers have a matching impedance so as to enhance a transmission of the acoustic wave generated by each of plurality of layers through the remaining plurality of layers.

In one embodiment, an electrical generator such as electrical generator 12 can be provided to electrically excite at least one piezo-electric layer in the plurality of piezo-electric layers to generate an acoustic wave pulse, as illustrated in FIG. 1D. For example, the electrical signal generator 12 can be configured to electrically excite the plurality of piezo-electric (e.g., PVDF) films 32 to generate a plurality of acoustic wave pulses that are separated in time to form a train of acoustic wave pulses. The electrical signal generator 12 can be configured to generate a wide variety of signal waveforms (tone bursts, frequency chirps, square waves, triangular waves, and any trigonometric waveform shape etc.) in addition to a Gaussian pulse, and a cascade of time delay generators. The time delay $\tau$ can be adjusted so that it is equal to the time for an acoustic pulse to propagate from one layer to the other so that it arrives exactly at the time when the next layer is excited. The time delay $\tau$ can be adjusted that it is substantially equal to a separation distance d between two consecutive PVDF films 32 divided by the velocity "c" of sound in the medium between the consecutive PVDF films 32. Hence, if, for example, the first film 32A is excited at time t equal to zero to generated a first pulse, the second film 32B can be excited at time t delayed by delay time $\tau$ to generate a second pulse, and the third film 32C can be excited at time t delayed by delay time 2τ to generate a third pulse, etc. In this way, the first pulse generated by the first film 32A arrives at the second film 32B at substantially the same time the second pulse is generated at the second layer 32B. Similarly, the first pulse and the second pulse arrive at the third film 32C at substantially the same time the third pulse is generated at the third layer 32C, etc. Each PVDF film 32 can be fed from these delay generators with the appropriate delay according to the position of the PVDF film 32 within the housing 34. Each PVDF film 32 can also be excited by a delayed electrical signal whose amplitude can also be properly adjusted and shaped. The purpose of this approach is to have acoustic pulses from all previous layers or films to arrive at the last layer when the last layer is excited so that all the waves add up and produce a strong pulse. If there are N layers then the signal emanating from the last layer will be approximately N times the power generated by each layer after subtracting off the loss of the signal in the layer and in the medium. Although it is simpler to have all layers positioned at equal intervals in space but that is not necessary. Indeed, the various layers can be positioned at any position and the interval between the layers can be different. The time delay can be appropriately selected to take into account the separation between the various layers. A linear phased array approach with fixed frequencies can also be implemented by properly varying the delay between the PVDF films 32.

In one embodiment, each PVDF film was excited by a 500 kHz tone burst. Frequencies from 50 kHz to 1 MHz may also be used if desired. There is no higher cut off frequency till almost 100 MHz and is only somewhat limited mainly by the absorption of sound in the liquid that these films are immersed in. Experimental data is plotted in FIGS. 1E and 1F. FIG. 1E shows the signal from all 4 PVDF transmitters when no electronic delay is used. In this case, each signal arrived at the receiver based on its distance from the receiver. FIG. 1F on the other hand shows when appropriate time delay was used, all the signal arrived at the last transmitter at the same time. In this case, the detected signal by the receiver now shows the large superimposed signal.

The efficiency of the end-fire acoustic source can be increased by using PVDF films that are slightly curved instead of being stretched flat. In one embodiment, each PVDF film can be provided with plastic cross made of thin plastic wire (or a metal wire) attached to it so as to make the surface of film slightly curved in a symmetrical manner. Each of the PVDF films has a thin layer of electrode on opposite sides where electrical connections are made for the excitation of the film. The array of films 32 is built into a wire frame and then inserted into the cylinder. The cables are brought out through an exit hole on the absorber side of the cylinder.

For example, in operation, a first PVDF film 32A may be configured to generate a first acoustic pulse, a second PVDF film 32B may be configured to generate a second acoustic pulse delayed relative to the first pulse, a third PVDF film 32C may be configured to generate a third acoustic pulse delayed relative to the second acoustic pulse, etc. The third PVDF film 32C can be configured to be transparent to the first and second acoustic pulses. The second PVDF film 32B can be configured to be transparent to the first acoustic pulse. The first, second and the third acoustic pulse are summed and, as a result, the PVDF film acoustic source 30 can output a signal comprising the first, the second and the third acoustic pulses. This provides not only the ability to control the power of the output acoustic beam but also the energy of the individual pulses and the delay between the various pulses. In this example, the PVDF film acoustic source 30 is described as having three PVDF films. However, any number of PVDF films can be used. In one embodiment, the housing 34 is surrounded by an acoustic absorbing materials (not shown) to prevent an acoustic energy scattering to the side of the housing 34.

In another embodiment, the sound waves generated by each of the PVDF films 32 arrive at the front disc 33 at the same time and add up in power. Each PVDF film is excited by an electrical pulse (Gaussian shaped) that has a signal bandwidth between about 15 kHz and about 120 kHz. However, the PVDF can be excited to generate acoustic waves at any frequency range within the operating frequency of the films. In this way, all the sound pulses generated by each element or PVDF film 32 arrives at the front element 33 at the same time and sum up to produce a powerful signal that is close to N times the power output of each element after subtracting the small transmission loss in the liquid and the film. The loss in the liquid is minimal at these frequencies.

In one embodiment, the collimated acoustic beam 18 can be steered in a particular direction by an acoustic beam guide 20. In one embodiment, the acoustic source (transducers 16 and non-linear material 17 or acoustic source 30) and acoustic beam guide or steering device 20 are disposed within a housing 22. The acoustic beam guide 20 can be an acoustic reflector or an acoustic lens, or a combination of both. The acoustic reflector can be a material with different acoustic impedance from the surrounding medium in which the beam propagates. One non-limiting example of such an acoustic reflector is metal plate. In one embodiment, the acoustic lens may be configured to focus the collimated acoustic beam at a particular focal point and direction and can have a concave shape. A Fresnel-type mirror arrangement can also be used for the acoustic beam guide. The acoustic beam guide 20 can be rotated or tilted into a particular orientation by using one or more actuators (not shown) coupled to the acoustic beam guide 20. Alternatively, in some embodiments, the acoustic beam guide 20 may not be used, and the collimated beam 18 would propagate along the axis of the housing 22. For example, the housing 22 can be made of plastic or other suitable material. In one embodiment, the housing 22 can be in the form of a cylinder or pipe section with a circular base, as shown in FIGS. 1A and 1B. However, the housing 22 may have other configurations such as a cylinder with a polygonal base (e.g., square, rectangular, hexagonal, pentagonal, etc.). In one embodiment, the housing 22 may be filled with a liquid (e.g., water).

Figure 14A:
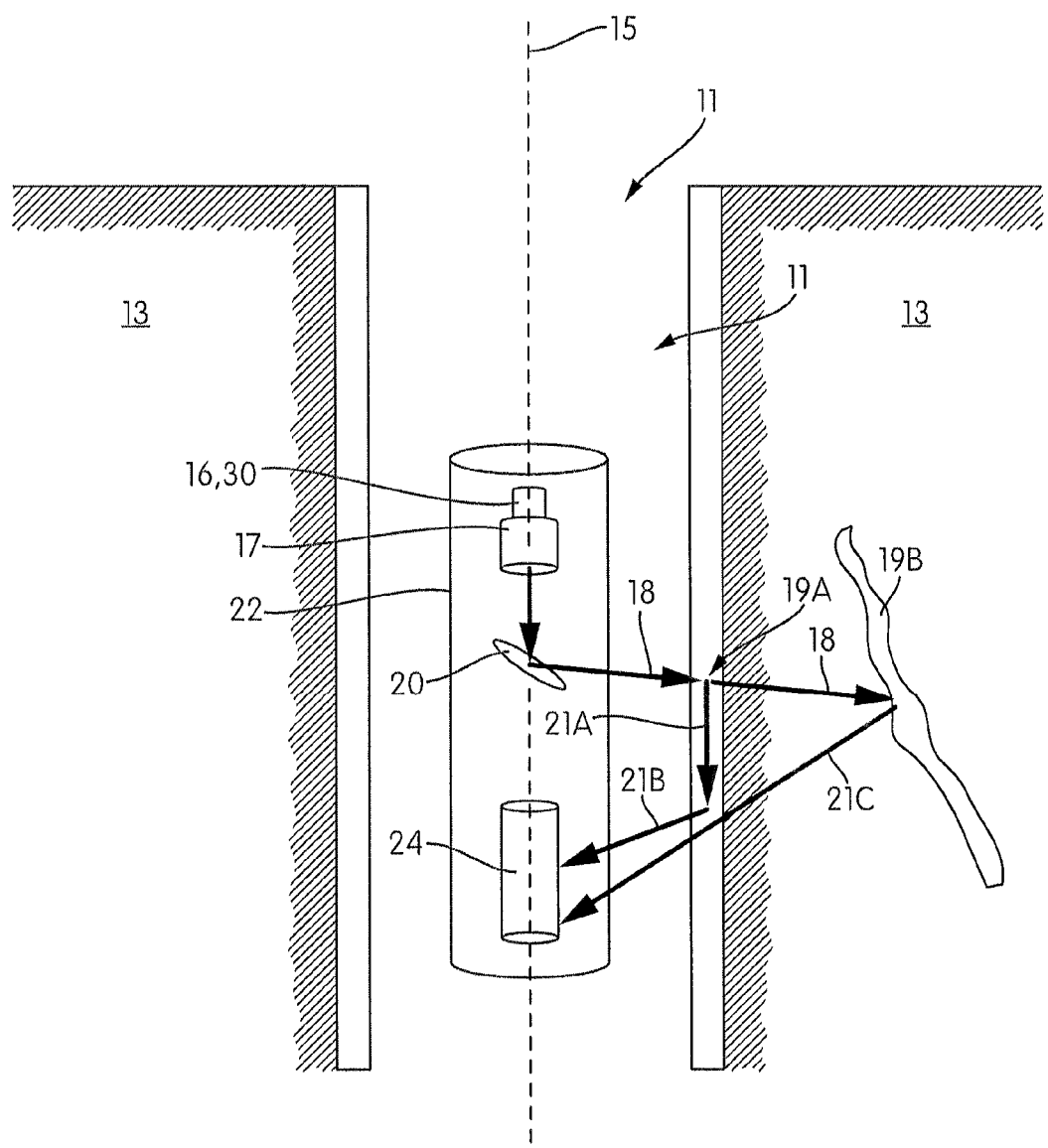
FIG. 14A depicts the acoustic measurement system disposed within a borehole, according to embodiment of the present invention.

FIG. 14A depicts the acoustic measurement system disposed within a borehole, according to embodiment of the present invention. The collimated beam 18 can be steered to a particular direction toward an object or target of interest such as a cement sheath or rock layers behind casing 19A within a borehole 11 or object 19B (e.g., crack, fracture, void, etc.) within the rock formation 13 near the borehole 11, as shown in FIG. 14A. Inhomogeneities of formations, materials or structures, such as object 19A, for example, will generate refraction or surface wave propagation 21A which is scattered as acoustic wave 21B and detected by receiver 24. Similarly, inhomogeneities within the rock formation 13 such as crack or fracture 19B creates a reflection or scattering of the acoustic beam 18 and the reflected acoustic wave 21C can then be detected by receiver 24. Acoustic beam 18 can generate elastic waves, e.g. refractions and surface propagation waves, traveling along the boundaries with the rock formation 13 and boundaries between the borehole and rock formation 13. The reflected, scattered waves or surface waves and other types of waves are received by receiver 24.

FIG. 14B depicts the acoustic measurement system disposed within a borehole, according to another embodiment of the present invention. In this embodiment, the acoustic beam 18 output by the acoustic source 16, 30 can be directed using steering device 20 downwardly generally in the direction of axis 15 of borehole 11. In this case, the acoustic beam or acoustic wave 18 can be used to investigate rock formation 13 that has not been drilled and thus investigate ahead of the drill bit. This can be performed, for example, during drilling operations. When the acoustic beam 18 is directed generally downwardly towards the rock formation 13, object(s) 19C (e.g., rock layers within the rock formation) reflect some of the acoustic beam energy 18 as acoustic wave 21D which can then be detected by receiver 24. The location or distance of the object 19C from the acoustic source 16, 30 can then be determined based on the received acoustic wave 21D.

Figure 14C:
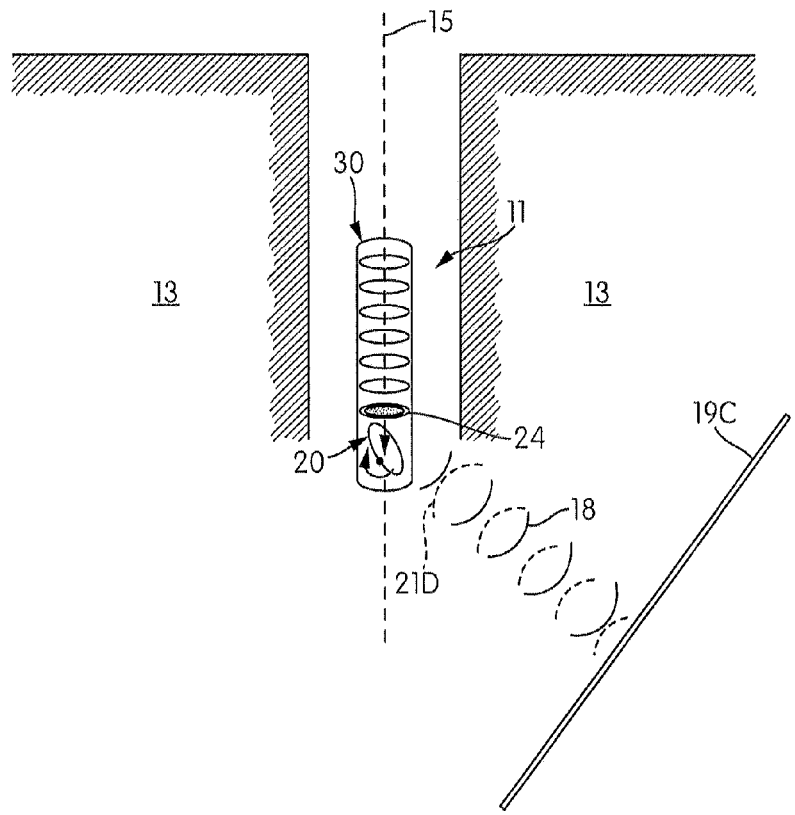
FIG. 14C depicts the acoustic measurement system disposed within a borehole, according to yet another embodiment of the present invention.

Similarly, amount of tilt of the layers 19C can also be determined based on the inclination of the acoustic beam 18 (e.g., relative to borehole axis 15) and received acoustic wave 21D. FIG. 14C shows a situation where the layers 19C are tilted relative to the borehole 11 or borehole axis 15. In this case, the beam steering device 20 (e.g., a tiltable acoustic mirror or prism, etc.) which is disposed in front of the source 30 can be used to direct the acoustic beam 18 in any direction including a direction towards the layers 19C. If the steering device 20 is positioned vertically, then it allows the sound beam from the source to pass through without any significant amount of blockage. If the layers 19C are tilted at an angle then the acoustic beam 18 will not be reflected by the layers 19C and as a result no reflected acoustic signal is detected by the receiver 24. If, on the other hand, the steering device 20 is rotated or tilted such that the orientation of the acoustic beam 18 is substantially perpendicular or normal to layers 19C, an acoustic signal 21D can then be reflected from the tilted layers 21D and can be detected by the receiver 24. The steering device can be oriented azimuthally in addition to inclination or elevation to provide a complete picture of what lies ahead of the drilling bit.

As shown in FIG. 1B, the receiver 24 can also be provided within housing 22. However, the receiver 24 can also be provided separate from the housing 22 to allow independent movement of the receiver 24 and source 16. The receiver 24 can be configured so as to receive the reflected, scattered, diffracted, etc. wave 21. In one embodiment, an acoustic absorber 23 can be disposed between the acoustic beam guide 20 and the receiver 24, for example to prevent acoustic waves that may have not been reflected or otherwise directed by beam guide 20 from reaching the receiver 24. In one embodiment, by placing the receiver 24 within the same housing 22, the receiver 24 is able to receive the reflected or scattered wave 21 while the housing 22 is moved, i.e., the source 16 and the receiver 24, and the housing 22, etc. are moved as a whole as a single device 9 along the borehole 11 (as shown in FIG. 14). However, in another embodiment, the acoustic source (e.g. the acoustic source 16 with mixing material 17 or the acoustic source 30) and the receiver 24 can be independently moved along the borehole 13. The reflected acoustic waves 21 are detected by receiver 24 and are converted into an electrical signal which can be transmitted to processing electronics 26 for analysis. The processing electronics 26 can include a computer with appropriate software for characterizing the rock formation or material or structure surrounding the borehole, including producing 2D or 3D images of the formation or the material around the borehole 11.

In some embodiments, the entire device 9 including the transducers 16 (or the end-fire acoustic source 30), the non-linear material 17, the steering device 20, and receiver 24 can be moved up and down the length of the borehole 11 to image a particular formation near the borehole or investigate the structure of the borehole casing. However, in other embodiments, the acoustic source (e.g., the acoustic source 16 with mixing material 17 or the acoustic source 30) and the steering device 20 can also be moved independently from the receiver 24 (for example while the receiver is fixed). Moreover, the entire device 9 with or without the receiver 24 can be rotated around the axis 15 of the borehole 11 to image rock formations, structures, materials, etc. in any azimuthal direction around the borehole 11.

Figure 2A:
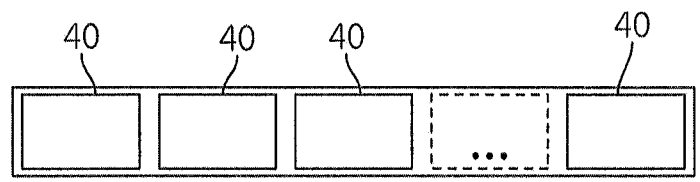
FIGS. 2A-2C are schematic representations of a receiver, according to various embodiments of the present invention.
Figure 2B:
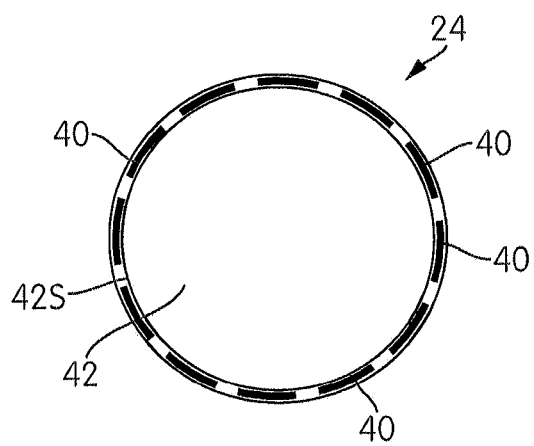
Figure 2C:
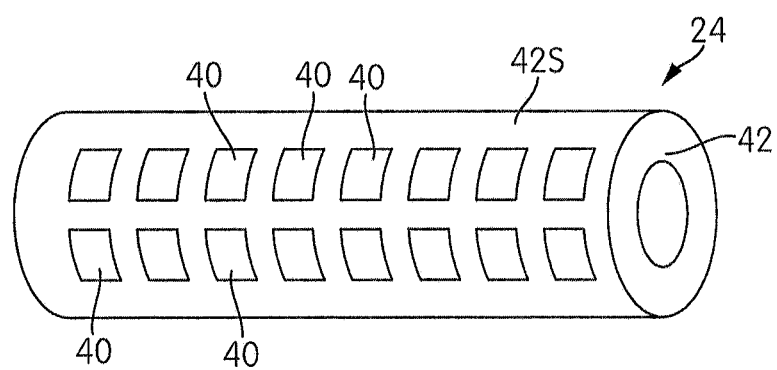

FIG. 2A is a schematic representation of the receiver 24, according to an embodiment of the present invention. The receiver 24 comprises a plurality of receiver elements 40. The receiver elements 40 can be an array of PVDF films. In one embodiment, the array can be produced from a single PVDF sheet with properly depositing electrodes on both sides of the film (or etching out a previously metallized electrode over the entire surface) and leaving a gap between neighboring elements. Each of these electrodes then behaves as a piezoelectric receiver element, A typical array element size can be approximately 1 cm×1 cm but it can be almost any size depending on the needed resolution of the experiment. In one embodiment, electrical lines can be laid down on the film or the PVDF sheet for electrical connections. The entire sheet with electrodes can then be covered with a very thin sheet of material (e.g., Mylar) for protection and electrical shorts. Therefore, a linear array can be wrapped around, as shown in FIG. 2B, as a circular configuration made around an acoustically absorbing material (e.g., foam) to create a circular array that covers 360 degrees. The receiver elements 40 are mounted on surface 42S of an acoustic absorbing material (e.g., acoustic absorbing foam, sponge or various types of silicon rubber) 42. FIG. 2C depicts a schematic representation of the receiver 24, according to another embodiment of the present invention. In this embodiment, a large sheet of PVDF film can be used to create an array of 2-dimensional arrangement (i.e., a matrix arrangement) of transducer receiver elements 40. The array of transducers 40 can then be wrapped around a cylindrical configuration to create an array that can provide complete 360 degree coverage around the axis of the cylindrical configuration, in addition to vertical coverage along the axis of the cylindrical configuration. In this way, the receiver array does not need to be physically rotated azimuthally in the borehole. In this case, a different vertical series or rows of PVDF layers or a one-dimensional array of PVDF films within the two-dimensional array of PVDF film can be electronically selected to detect acoustic signals. Typically, in operation, all PVDF elements can be scanned first at a given location to determine the direction from which any signal is coming and then the appropriate vertical arrays can be used to track this signal. Signal multiplexor electronics can be used to carry out this kind of electronic scanning and the detected signal can be subsequently amplified and digitized. As shown in FIGS. 2B and 2C, the acoustic absorbing material 42 has a cylindrical configuration with a circular base. However, as it can be appreciated, the absorbing material 42 can have any desired configuration such as a cylindrical configuration with a polygonal base or elliptical base, or other shape. By mounting the receiver elements 40 on the surface 42S of the absorbing material 42, the receiver elements 40 receive acoustic signals from the front side of the receiver elements 40 and not from the back side of the receiver elements 40.

Figure 3:
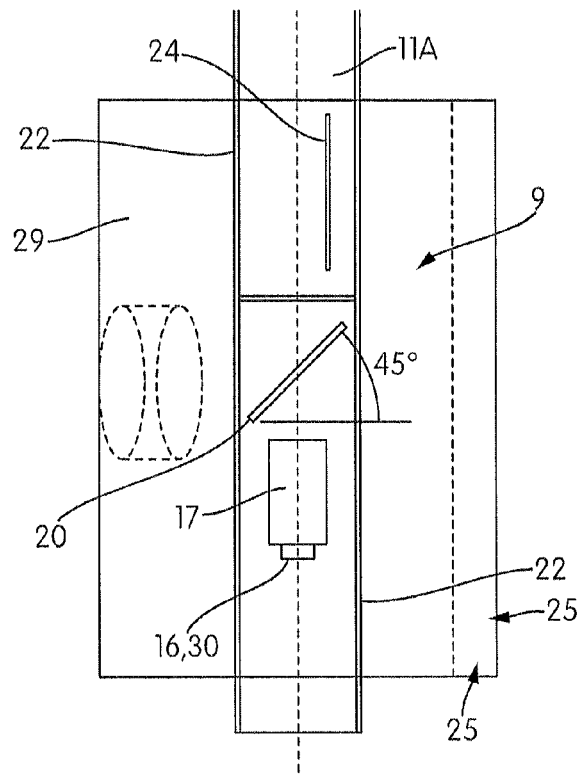
FIG. 3 is schematic diagram of an acoustic measurement system, according to an embodiment of the present invention.

FIG. 3 is schematic diagram of a laboratory measurement system or experimental set up to test the measurement system when deployed in a borehole environment, according to an embodiment of the present invention. In the experimental set up, the housing 22 including the acoustic source (e.g., the acoustic source 16 with mixing material 17 or the acoustic source 30), the beam steering device 20 and the receiver 24 are positioned within an axial borehole 11A in a barrel (e.g., a cement barrel) 29 that simulates the borehole 11 with a cement casing. The acoustic measurement system 9 includes acoustic source (e.g., the acoustic source 16 with mixing material 17 or the acoustic source 30), mirror system 20 and receiver 24. In one embodiment, acoustic source (e.g., the acoustic source 16 with mixing material 17 or the acoustic source 30), non-linear medium 17, mirror system 20 and receiver 24 are disposed inside housing 22. In one embodiment, the receiver 24 is configured such that it only receives acoustic signals from the front. The receiver 24 is shielded from other signals such as back signals (i.e., signals that are incident on the back of the receiver 24 are absorbed by absorber 42). In one embodiment, the receiver 24 is configured to move with acoustic source (the acoustic source 16 with mixing material 17 or the acoustic source 30). In another embodiment, the receiver 24 can be moved independently of the acoustic source (the acoustic source 16 with mixing material 17 or the acoustic source 30). In order to test the efficacy of this measurement system, a groove 25 is provided at an outer periphery or outer surface of the barrel 29 (e.g., concrete or cement barrel), as will be explained further in detail in the following paragraphs.

In one embodiment, the acoustic source (the acoustic source 16 with mixing material 17 or the acoustic source 30) and the receiver 24 are configured such that the beam direction from the acoustic source (the acoustic source 16 with mixing material 17 or the acoustic source 30), i.e., acoustic beam 18, and the received signal 21 lie on the same plane. In one embodiment, both the acoustic source (the acoustic source 16 with mixing material 17 or the acoustic source 30) and receiver 24 are rotated azimuthally from 0 to 360 degree. However, in another embodiment, only the mirror 20 is rotated while the source (the acoustic source 16 with mixing material 17 or the acoustic source 30) and the receiver 24 are fixed. Indeed, by providing receiver 24 with a cylindrical configuration where receiver elements 40 are disposed on the surface of the cylindrical configuration, the receiver 24 is able to detect an acoustic signal at angle from 0 to 360 deg. without having to move or rotate the receiver 24. Similarly, the acoustic source (the acoustic source 16 with mixing material 17 or the acoustic source 30) need not be reoriented to be able to scan a desired field azimuthal angle. The azimuthal field angle can be scanned by simply rotating the steering device (e.g., mirror 20). The acoustic beam emitted by the acoustic source (the acoustic source 16 with mixing material 17 or the acoustic source 30) is reflected by the beam steering device (e.g., mirror) 20 and directed as acoustic beam 18 towards inner wall of cement barrel 29. The acoustic beam 18 interacts with the material of the barrel 29, the material outside barrel 29, the interface between the housing 22 and the barrel 29, etc., and generates reflections, refractions or surface waves, or any combinations of thereof. In a first scenario, the acoustic beam, after being reflected by the mirror 20, may undergo a reflection by the material of the barrel (e.g., cement barrel) 29 or the rock formation, or both. The reflected acoustic signal may then be detected by receiver 24. This scenario is generally referred to as a reflective mode. In a second scenario, the acoustic signal, after being reflected by the mirror 20, may be refracted by the material of the barrel (e.g., cement barrel) 29 at the interface between the cement barrel 29 and the rock formation. The refracted acoustic signal may then be detected by receiver 24. This scenario is generally referred to as a refractive mode. In yet a third scenario, the acoustic signal, after being reflected by mirror 20 may generate surface waves at the interface between a surface of the borehole and the cement in the barrel 29 (or rock formation in a field deployment) or at interface boundaries within the cement (or rock formation). The surface waves will emit returning acoustic signals that can be detected by the receiver 24. This scenario is generally referred to as a surface wave mode.

Figure 4A:
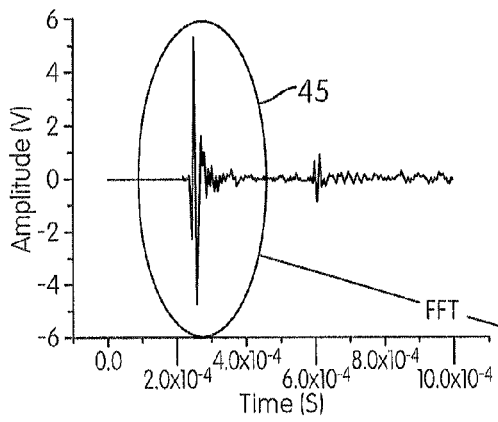
FIG. 4A illustrates a characteristic of a parametric array beam pulse signal emitted by an acoustic source, according to an embodiment of the present invention.
Figure 4B:
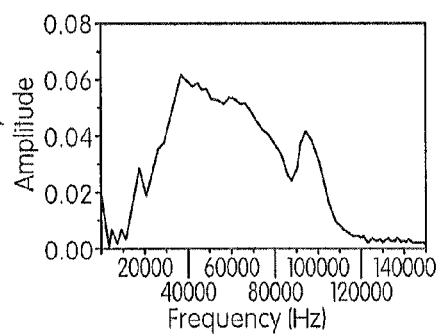
FIG. 4B is a fast Fourier transform (FFT) of the acoustic beam signal of FIG. 4A to obtain the signal in the frequency domain.

FIG. 4A illustrates a characteristic of the beam pulse signal emitted by the parametric acoustic source disposed within the borehole in a laboratory experimental set up, according to an embodiment of the present invention. The acoustic beam signal pattern 45 on the exterior surface of the barrel 29 as a function of time (time domain) is measured using a laser Doppler vibrometer. The waveform of the signal 45 is shown in FIG. 4A. FIG. 4B is a fast Fourier transform (FFT) of the acoustic beam signal 45 to obtain the signal in the frequency domain. The frequency bandwidth of the signal 45 can be extracted from the FFT showing a broad frequency bandwidth between about 15 kHz and about 120 kHz.

The unique characteristics of the acoustic source (the acoustic source 16 with mixing material 17 or the acoustic source 30) can be combined with various receiver elements or modules 40 into a measurement system to perform azimuthal borehole sonic measurements, three-dimensional (3D) reflection imaging from a borehole, 3D refraction imaging, 3D fracture detection, 3D mapping of permeability, and 3D mapping of channels between the cement barrel and rock formation.

Because the high directivity of the beam pulse, many of the deficiencies of the existing borehole acoustic measurement systems cited above can be minimized. As discussed below, the system has good azimuthal resolution as well as inclination direction control. In one embodiment, the azimuthal angular resolution is between about 5 deg. and about 15 deg., for example 10 deg. This new capability enables the extension of borehole acoustic measurement to full 3D measurement (the $3^{rd}$ dimension being the azimuthal angle).

Figure 5:
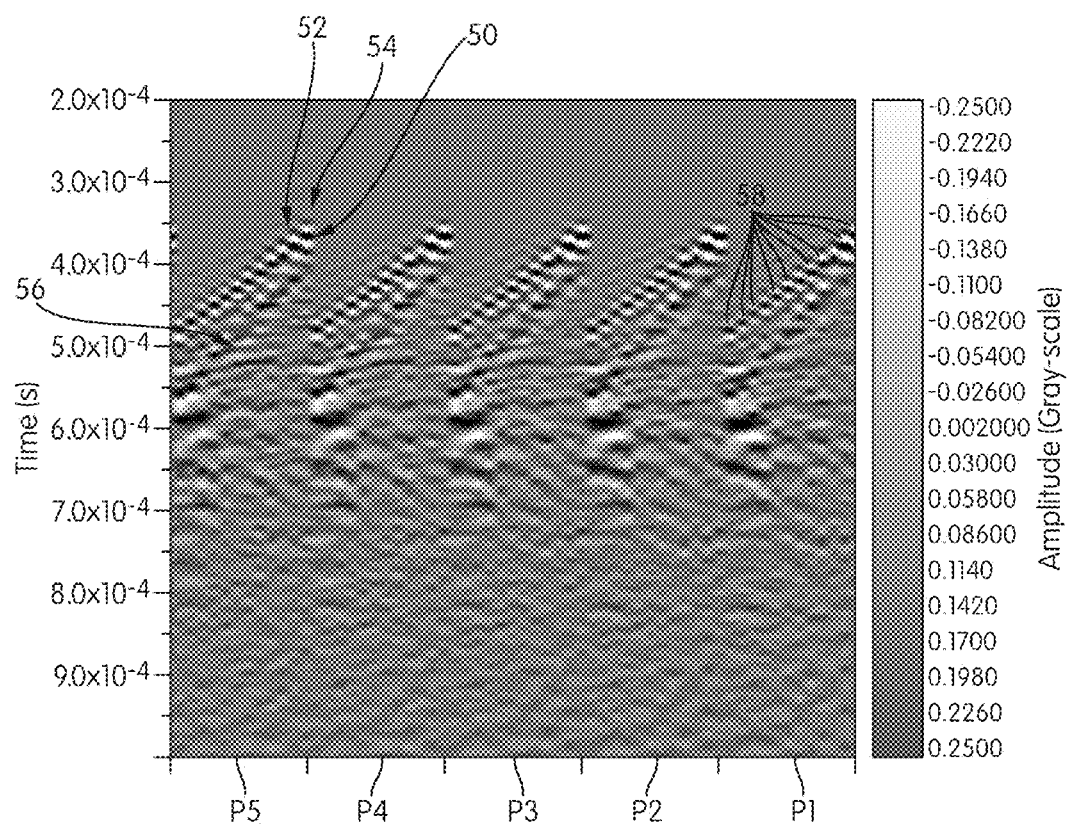
FIG. 5 depicts data collected as a function of propagation time and azimuthal angle, according to an embodiment of the present invention.
Figure 6:
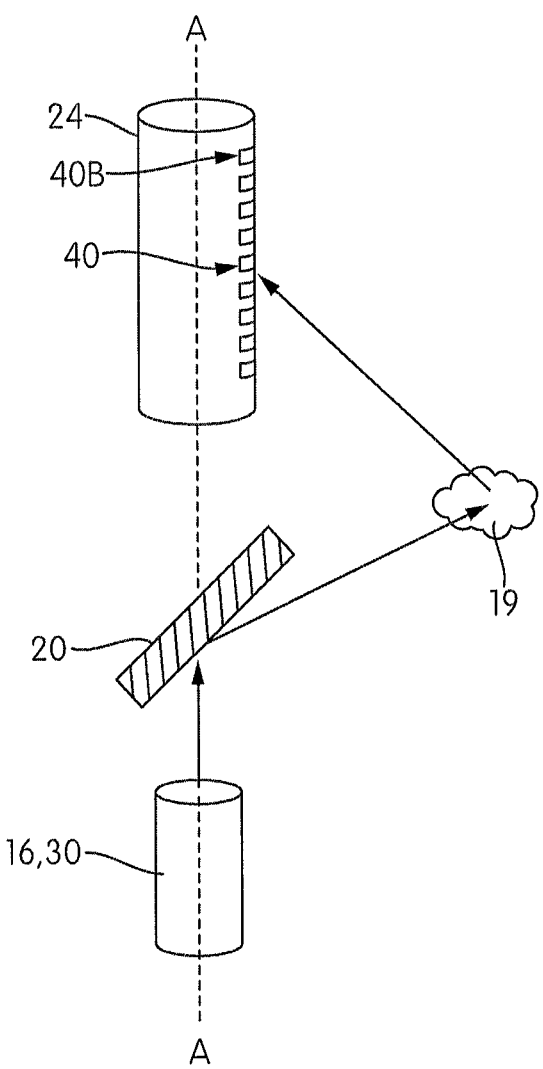
FIG. 6 depicts a schematic diagram of an experimental set-up with receiver having a linear array of receiver elements disposed on a surface of a cylindrical configuration, according to an embodiment of the present invention.

FIG. 5 depicts data collected as a function of propagation time, distance between receiver elements and acoustic beam source and azimuthal angle in an experiment using the experimental setup shown in FIG. 3, according to an embodiment of the present invention. In this experiment the beam source is directed at the rock formation at one azimuthal angle and one inclination angle, and the linear receiver 24 with receiver elements 40 is oriented to detect the returning signal in the same azimuthal angles as the source beam, as shown in FIG. 6. The entire assembly of source, mirror and receiver are rotated azimuthally in incremental steps of 10 degrees and the returning acoustic signals data are recorded for all receiver elements for each azimuthal increment. FIG. 5 shows five panels labeled as panel 1 to panel 5 (P1, P2, P3, P4 and P5). Each panel corresponds to data displayed for one azimuth measurement (i.e., azimuthal angle). Each 10 deg. azimuthal angle (i.e., 0 deg., 10 deg., 20 deg., etc.) corresponds to a different panel (P1 through P5). The y-coordinate in each panel represents the arrival time of the signal detected at the various receiver elements 40. The x-coordinate in each panel corresponds to the distance from vertical receiver element to the source. The gray scale of the display corresponds to the amplitude of the received acoustic signal. Within each panel are shown a plurality of data points 58. Each of these points 58 corresponds to a signal detected by one of the plurality of the receiver elements 40 of receiver 24. In this example, receiver 24 is provided with 12 receiver elements 40. Therefore, 12 data points are detected by the receiver 24, each point corresponding to a signal detected by one of the 12 receiver elements 40. Each of the 12 data points has a different arrival time corresponding to the arrival of the signal to each of the 12 receiver elements 40. As shown in FIG. 5, the first linear signal arrival 50 corresponds to P-wave compression refraction wave commonly measured in sonic log. The second and third linear signal arrivals 52 and 54 correspond to surface waves such as Rayleigh, Stoneley or Lamb waves. Signal arrivals due to reflection from cement/air interface at barrel perimeter are shown at 56.

Figure 7:
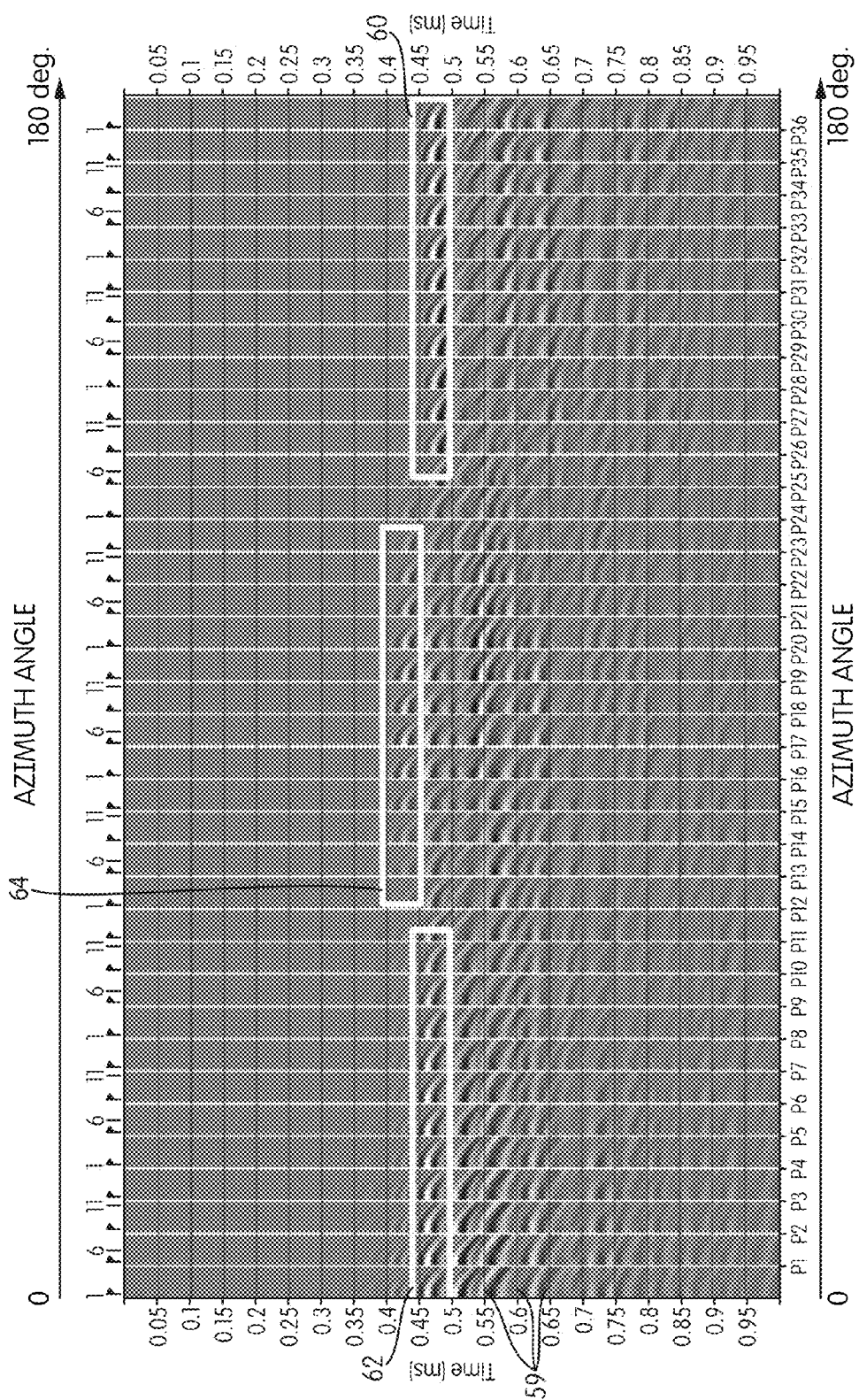
FIG. 7 depicts reflection data obtained in an experiment similar to the data shown in FIG. 5 but after performing signal processing to filter out the linear arrivals; according to another embodiment of the present invention.

FIG. 7 depicts reflection data obtained in an experiment similar to the data shown in FIG. 5A but after performing signal processing to filter out the linear arrivals. There are 36 panels P1-P36 and each panel corresponds to an azimuthal angle and the 36 panels range from 0 to 180 degrees. For example, panel P1 corresponds to azimuthal angle of 0 deg. The y-coordinate represents the arrival time at the receiver 24. The y-coordinate in each panel represents the arrival time of the signal detected at the various receiver elements 40. The x-coordinate in each panel corresponds to the vertical distance from receiver element to the source. The gray scale of the display corresponds to the amplitude of the received acoustic signal. Within each panel, i.e., within each azimuthal angle range, hyperbola-like curves 59 can be seen. Each curve 59 corresponds to data of a signal detected by one single receiver element 40 in the receiver 24. The series of wave patterns 60 and 62 correspond to a reflection from a perimeter or outer periphery of the cement barrel 29 while the wave pattern 64 corresponds to a reflection from a surface of the groove 25 (at an interface of the cement and air). As it can be noted, the waves reflected from the surface of the groove 25 arrive to the receiver 24 earlier than waves reflected from the cylindrical surface of the barrel 29. Furthermore, the position of the groove 25 can be ascertained by using the azimuthal measurement method and system described herein. The present method achieves excellent azimuthal resolution which allows detecting defects within a structure such within a casing within a borehole or at an interface of the borehole and the rock formation, etc. For example, as it can be noted in FIG. 7, the groove 25 can be located at specific azimuthal angles or within an azimuthal angular range allowing a determination of a position or location of a structure, such as a structural defect, a fracture, or the like.

Figure 8:
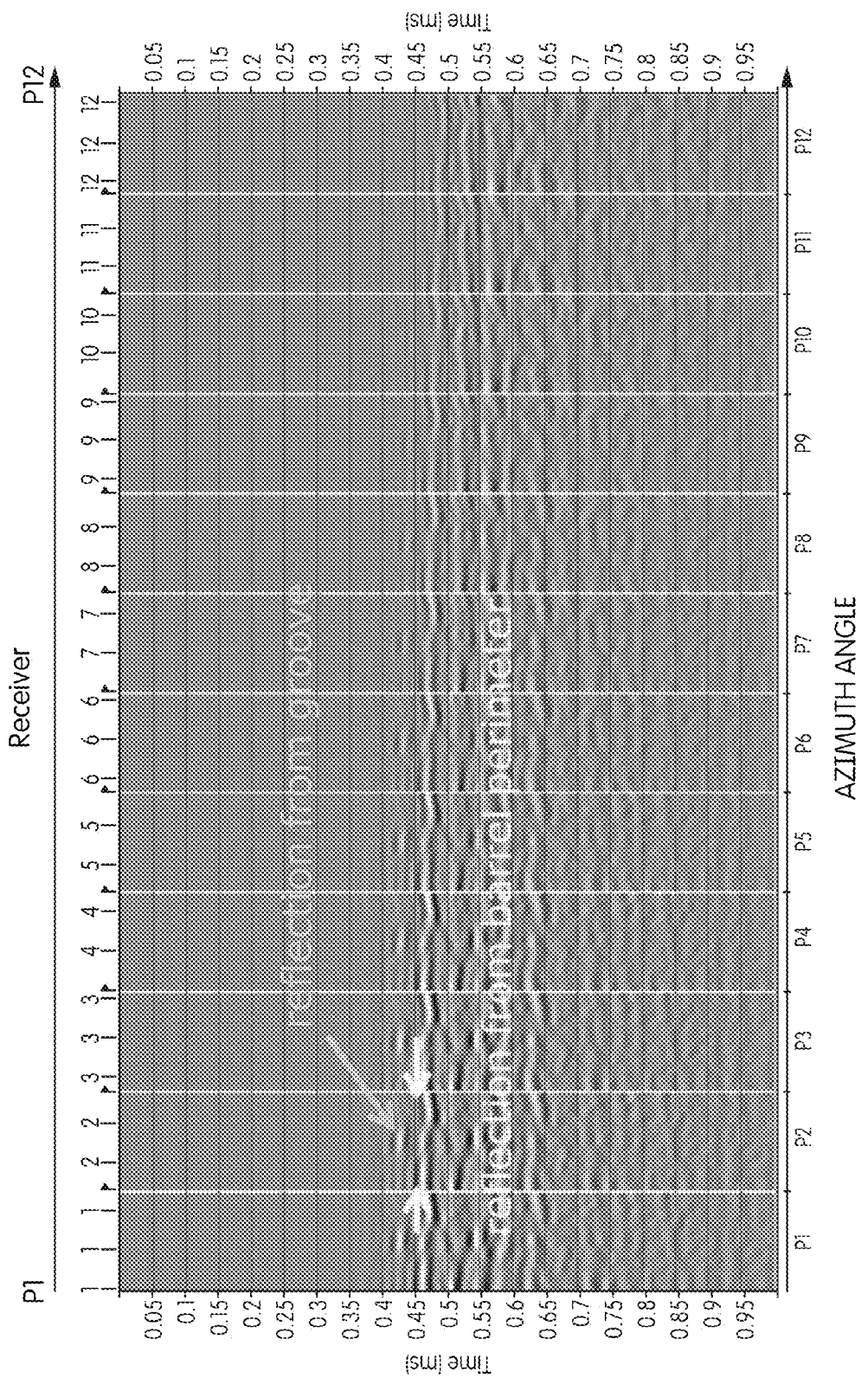
FIG. 8 depicts data collected as a function of propagation time and receiver number after performing signal processing to filter out the linear arrivals, according to an embodiment of the present invention.

FIG. 8 depicts a different data display of the same experiment with a different sorting. There are 12 panels (from P1 to P12) in FIG. 8. Each panel (P1, P2, . . . , P12) corresponds to data of signals detected by one of the 12 receiver elements 40 in receiver 24. Within each panel (e.g., panel P1) the x-coordinate represents the azimuthal angle (in the range from 0 deg. to 360 deg.). The y-coordinate represents arrival time at each of the 12 receiver elements 40 of receiver 24. The gray scale of the display corresponds to the amplitude of the received acoustic signal. As can be seen in FIG. 8, the reflection from the groove 25 is detected by some detector elements 40 (for example, at panels P1 through P4) and not by other detector elements (for example, at panels P9 through P12). In addition, it can be noted that, for panel P1 for example, the groove 25 is clearly seen in the middle of the panel which correspond to an azimuthal angle around 90 deg. The reason for detecting the groove 25 with specific receiver elements 40 (panels P1 through P4) and not by other receiver elements 40 (panels P9 through P12) is due to the fact that the acoustic beam 18 has a specific angular elevation spread and thus is reflected selectively to specific detector elements 40. Hence, detector elements 40 (corresponding to panels P9 through P12)) that are outside of the scattered, reflected, diffracted acoustic wave beam from the groove 25 are not able to detect the reflected, diffracted, scattered beam from groove 25. However, as it can be appreciated, if the receiver 24 is moved vertically, other receiver elements 40 within the receiver 24 can then detect the signal reflected, diffracted or scattered by the groove 25. In this case, the groove may then be seen in panels P6 through P10 if the inclination of the groove changes, for example. Hence, the present measurement system is not only capable to resolve a position of a structure in azimuthal angle but also in elevation angle as well.

Furthermore, the elevation information can be utilized to determine an orientation of the structure (e.g., groove 25). For example, in the laboratory experiment described in the above paragraphs, the groove 25 is parallel to the axis of the borehole in the cement barrel 29. However, the grove 25 can also be positioned oblique, i.e., at an angle relative to the borehole axis, in which case, the angular elevation information which depends on the orientation of the groove 25 can be different. Indeed, depending on the angular orientation of the structure (e.g. groove 25) relative to the borehole axis, the reflected, diffracted beam by the groove 25 can be directed preferentially to specific receiver elements 40. As a result, the groove 25 can be seen in the plotted data or image at different panels (e.g., at panels P7 and P8). By determining in which panels the groove 25 is detected, it is possible to infer the angular inclination of the groove 25.

Figure 9:
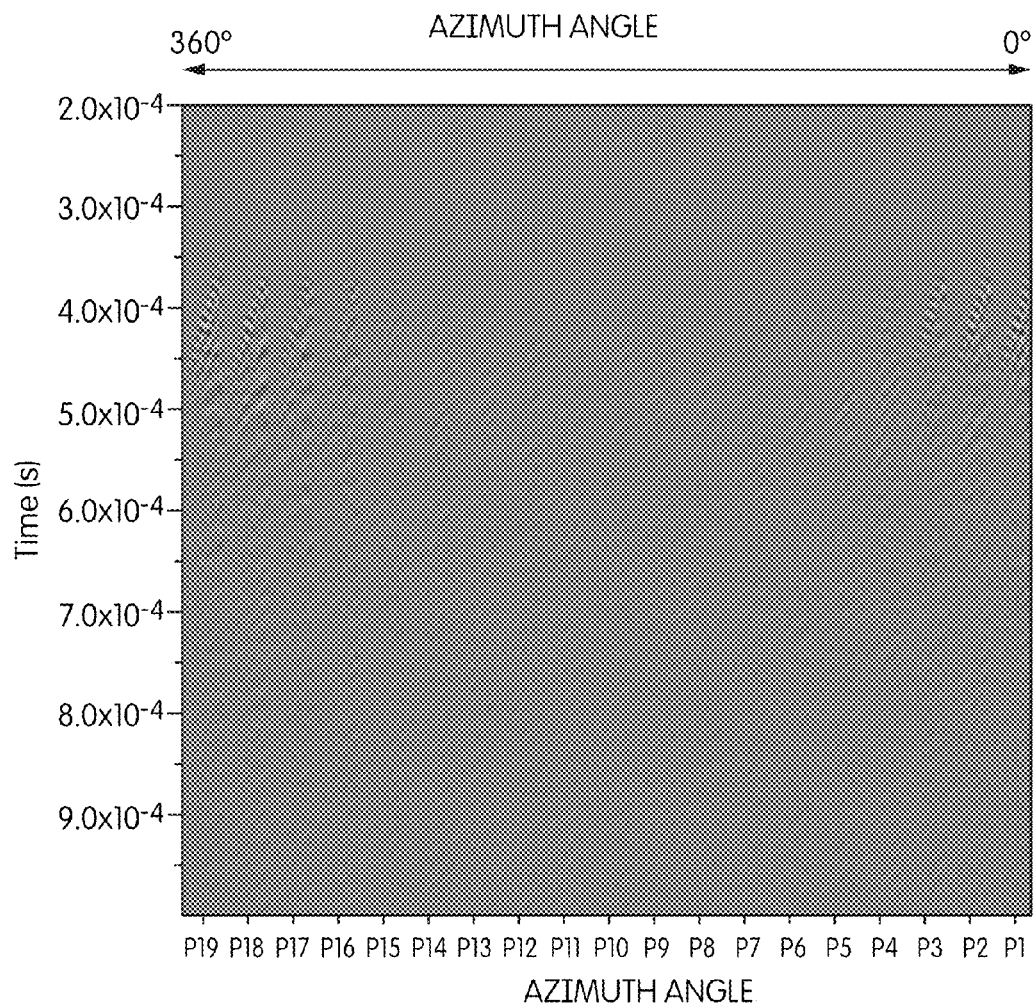
FIG. 9 depicts another experiment in which the orientation of the receiver 24 is fixed (i.e., the receiver is not rotated) and the mirror is rotated azimuthally; according to another embodiment of the present invention.

FIG. 9 depicts another experiment in which the orientation of the receiver 24 is fixed (i.e., the receiver is not rotated) and the mirror is rotated azimuthally between 0 and 360 degrees at an increment of 20 degrees. 19 panels are displayed with each panel corresponds to signal data recorded with one the azimuthal angle from 0 deg. to 360 deg. azimuthal angle at 20 degree increment. The y-coordinate represents arrival time at the receiver elements 40 of receiver 24. The x-coordinate in each panel corresponds to the vertical distance between the receiver element and the source. The gray scale of the display corresponds to the amplitude of the received acoustic signal. The data clearly shows excellent azimuth resolution with the maximum energy of the linear arrivals occurring when the beam orientation and receiver reception orientation are aligned. This shows that the propagation path that is rather narrow in extent and does not spread too much azimuthally.

Figure 10A:
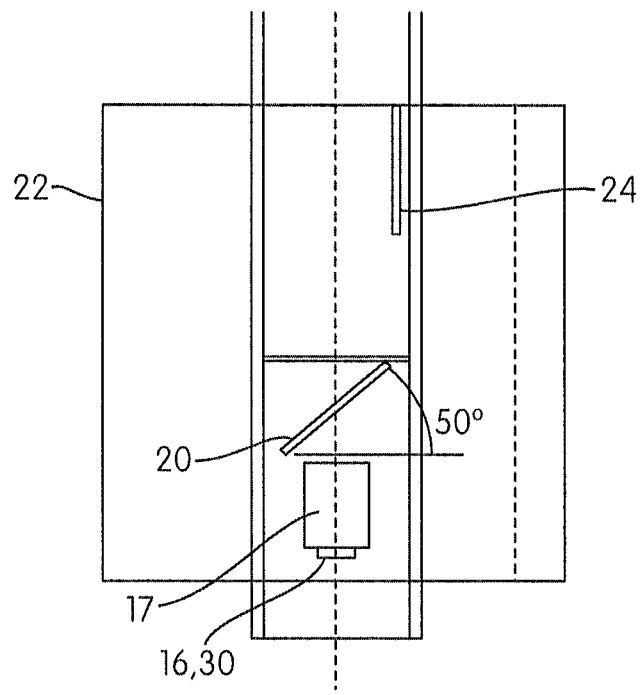
FIGS. 10A and 10B depict an experimental acoustic setup, according to another embodiment of the present invention where
Figure 10B:
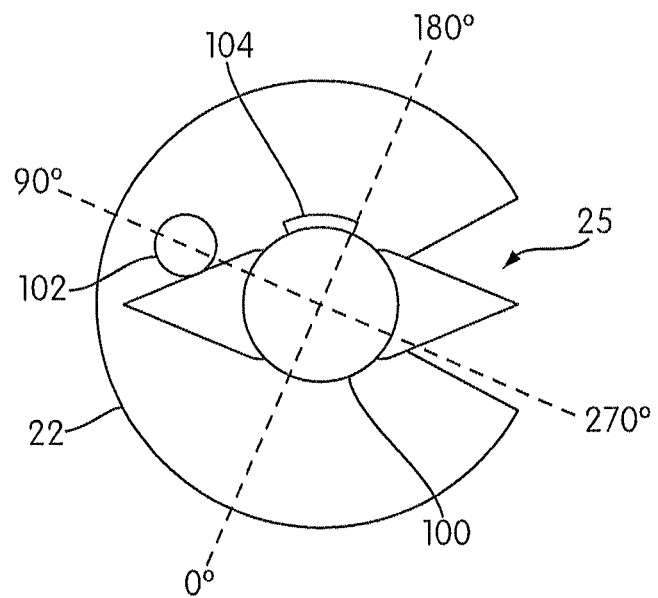

FIGS. 10A and 10B depict an experimental acoustic setup, according to another embodiment of the present invention. FIG. 10A is a longitudinal schematic view of the experimental setup and FIG. 10B is a top view of the experimental setup. The experimental setup includes is similar in many aspects to the experimental set up shown schematically in FIG. 3. The cement barrel 22 is lined with a steel axially arranged inner casing 100. A pipe or tube 102 is embedded within the cement barrel 22. A groove 25 is also cut or carved on an exterior surface of the cement barrel 22. A detachment foil 104 (e.g., Aluminum foil) is also provided within the housing 22. In this embodiment, the detachment foil 104 is disposed in contact with inner casing 100. Within the casing 100 of the cement barrel 22 are disposed the acoustic source 16, 30, the non-linear material 17, the mirror 20 and the receiver 24. As shown in FIG. 10B, axes are drawn to indicate azimuthal angular orientation (the orientation of the two axes is arbitrary). The groove 25 is located at azimuthal angle between about 230 deg. and about 280 deg. The pipe or tube 102 is located at an azimuthal angle between about 80 deg. and about 100 deg. The detachment foil (e.g., aluminum foil) is located at an azimuthal angle between about 140 deg. and about 190 deg.

Figures 11A, 11B, 11C:
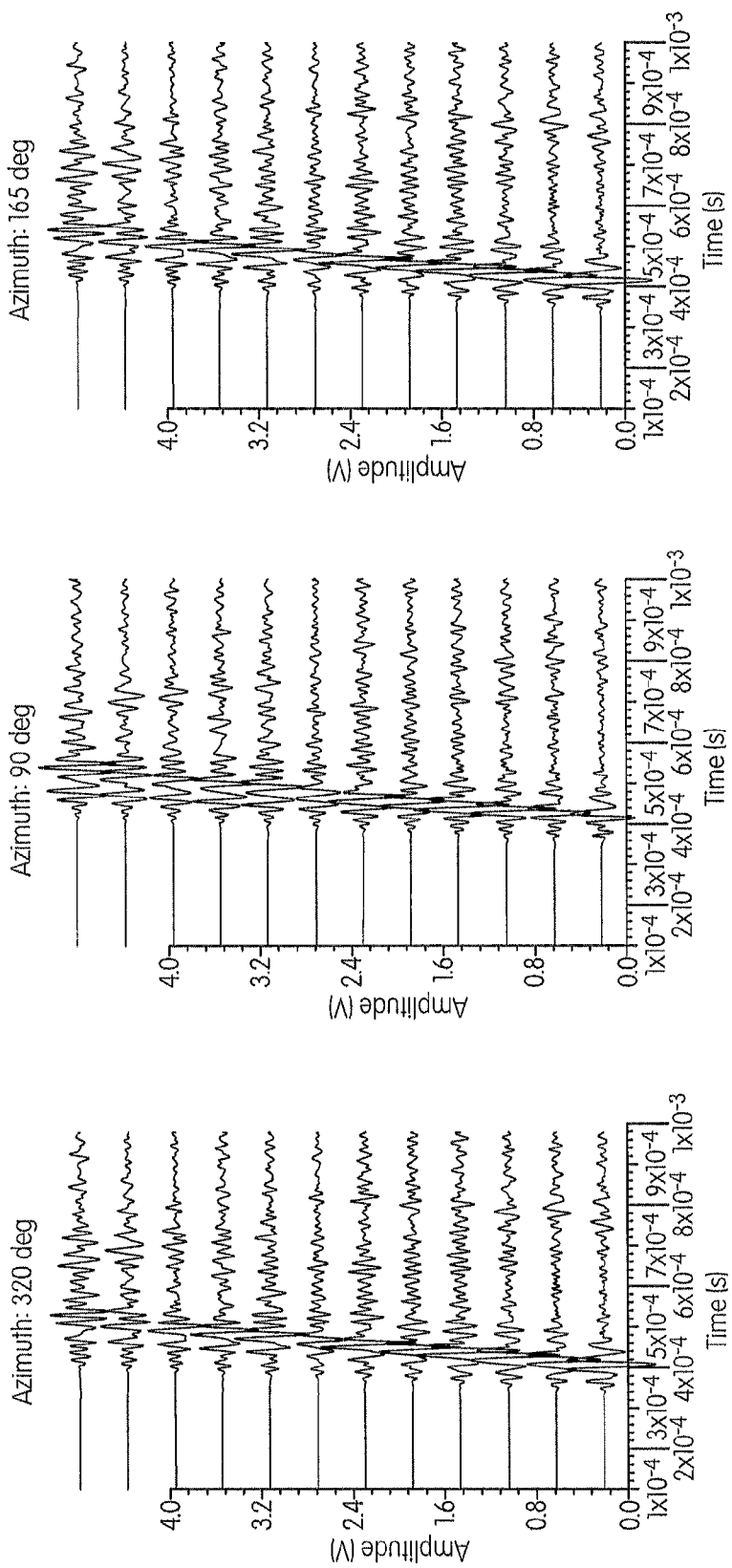
FIGS. 11A-11C show plots of the measured data for various azimuthal orientations or angles, respectively, at about 320 deg., at about 90 deg. and at about 165 deg., according to an embodiment of the present invention.

FIGS. 11A-11C show plots of the measured data for various azimuthal orientations or angles, respectively, at about 320 deg., at about 90 deg. and at about 165 deg., according to an embodiment of the present invention. The azimuthal orientation or angle of about 320 deg. (FIG. 11A) corresponds to the orientation of the acoustic beam in a region where there is no inclusion behind the inner casing 100, i.e., there is only the cement barrel wall. The azimuthal orientation or angle of about 90 deg. (FIG. 11B) corresponds to the orientation of the acoustic beam in a region where the tube (e.g., plastic pipe) 102 is included. The azimuthal orientation or angle of about 165 deg. (FIG. 11C) corresponds to the orientation of the acoustic beam in a region where the detachment foil (e.g., aluminum foil) 104 is provided. In this plot, the y-coordinate corresponds to the time it takes for the acoustic wave to be received by receiver 24, the x-coordinate in each panel corresponds to the vertical distance of receiver element from the source. The various curves in each plot correspond to the acoustic signals received by the various receiver elements 40 in receiver 24. In this example, there is provided 12 receiver elements 40 in receiver 24. However, any number of receiver elements can be used. The curve closest to the x-coordinate corresponds to the signal detected by the first receiver element and the curve farthest to the x-coordinate corresponds to the signal detected by the $12^{th}$ receiver element. The first receiver element is the receiver element that is closest to the acoustic source 16, 30 and the $12^{th}$ receiver element is the receiver element that is farthest from the acoustic source 16, 30.

As shown in FIG. 11A, with no inclusion behind the inner casing 100, the surface waves decay with distance along the borehole, i.e. decay from the first receiver element to the $12^{th}$ receiver element. As shown in FIG. 11C, with the delamination or detachment foil 104 behind the casing 100, the surface wave amplitude is larger and decays more slowly as expected because the steel pipe is not dampened by the contact with the cement (i.e., the aluminum foils carries the acoustic waves farther along the borehole). As shown in FIG. 11B, at azimuth angles corresponding to the pipe 102, the surface wave amplitude is larger and also decays more slowly. In addition to the surface wave, a fast linear arrival just behind the P-wave first arrival is recorded indicating additional wave mode traveling along the wall of the pipe 102. This measurement data clearly show that azimuthal information of rock formation behind the steel casing can be gleaned from linear arrivals using a borehole acoustic measurement system.

In addition to the ability of changing the azimuthal orientation of the acoustic source beam by changing the azimuthal angular direction of the mirror 20, the inclination of mirror 20 can also be changed to send the acoustic source beam along any vertical direction. This allows the acoustic source beam to be injected at different inclinations and azimuthal directions to probe for reflection boundaries, refraction boundaries and fractures of different orientations in the rock formation. The data can be subsequently analyzed using various conventional methods. Analysis of refraction arrivals along with azimuthal resolution can provide for 3D imaging of velocity by refraction analysis. This can provide better characterization of near borehole alteration and characterization of the skin of reservoirs.

In one embodiment, the measurement data are collected using broadband beam pulse. In this way, information with broad frequency bandwidth can be collected relatively quickly. Indeed, in this case, there is no need to sweep the frequency by chirping. Furthermore, in one embodiment, the use of multiple acoustic sources to cover the entire the bandwidth, for example, between about 15 kHz and about 120 kHz, may not be needed. The acoustic beam pulse with broad bandwidth, for example between about 15 kHz and about 120 kHz, can provide measurements that can yield information on cement bonding between the cement and the rock formation in a borehole.

The present measurement system can be used for evaluating a cement casing or steel casing in a borehole. A simulation of guided wave propagation through the steel casing when a sound beam pulse interacts with the steel casing is performed under certain geometrical conditions. In this simulation, a 25 mm thick layer of cement is used between the steel casing and Berea sandstone. The Berea is considered infinite in extent. It is also assumed that the borehole is filled with water and there is energy sink along the axis of the borehole. The simulations were carried out using the DISPERSE software package from the Imperial College, UK.

Figure 12A:
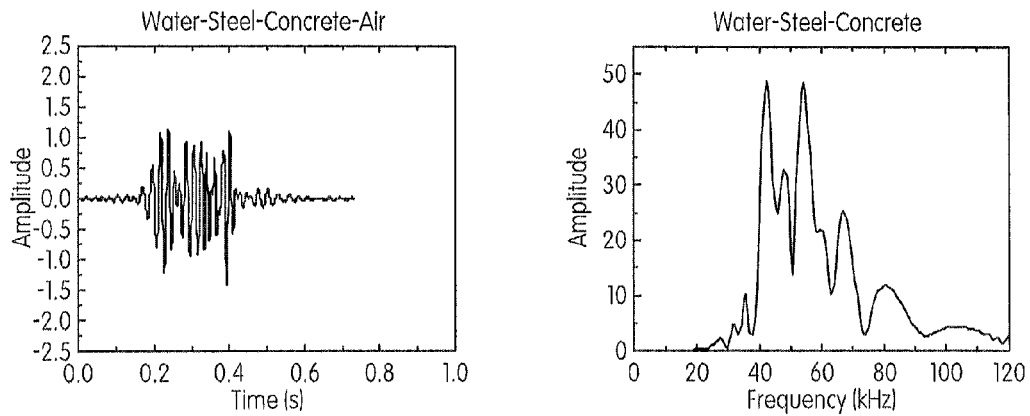
FIGS. 12A-12C show plots of synthetic wave forms of acoustic measurement in the frequency range of 15-120 kHz for various borehole conditions, according to embodiments of the present invention.
Figure 12B:
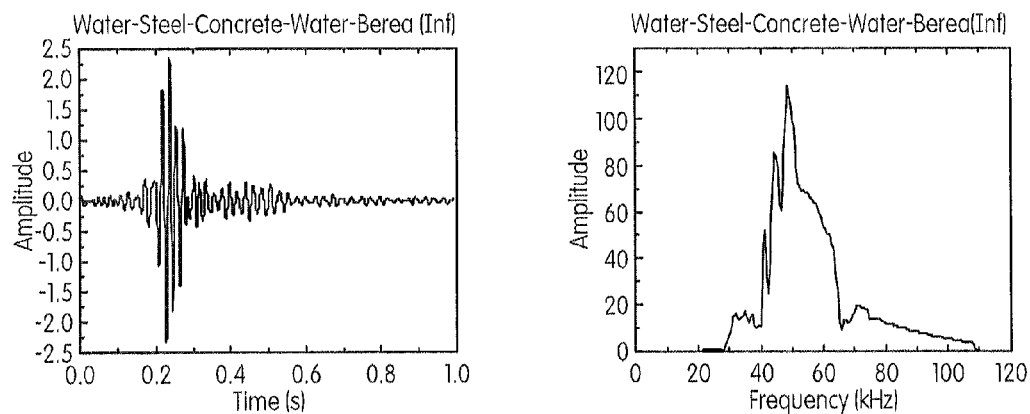
Figure 12C:
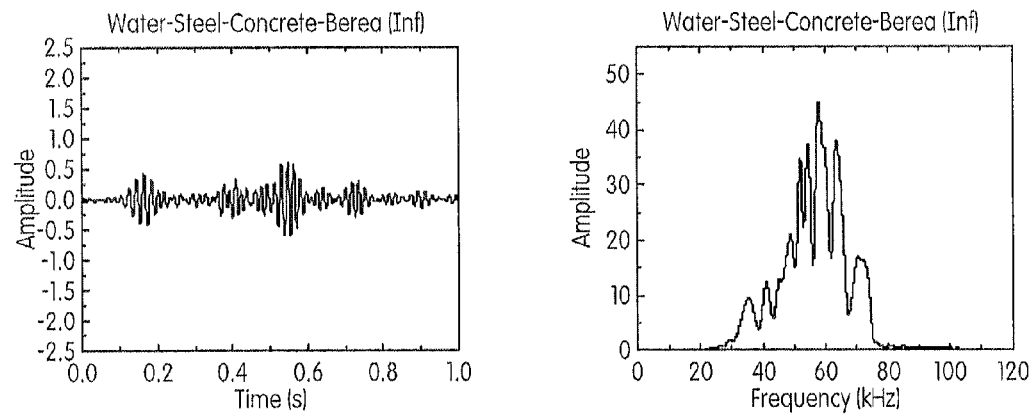

FIG. 12A-12C show plots of the acoustic simulation in the frequency range of 20-120 kHz for various conditions. The data in these plots are captured in the instance where the borehole is filled with water. Each data set is generated under different condition but in each case the receiver is at a distance of 12 inches from the excitation point on the steel casing in the axial direction. These data are showing the propagation characteristics of a sound pulse (frequency chirp) of 100 microsecond duration with a frequency span of 20-120 kHz and with a Gaussian envelope. The graphs on the left side show the amplitude of the received acoustic signal as a function of time and the graphs of the right side show the fast Fourier transform of the acoustic signal to the frequency domain where the amplitude is plotted as a function of the frequency, FIG. 12A is a plot of the data captured with water-steel-concrete-air, where there is an air gap between the concrete and the Berea sandstone. FIG. 12B is a plot of the data with water-steel-concrete-water-Berea, where there a water gap (e.g., a 1 mm gap) between the concrete and Berea. FIG. 12C is a plot of the data captured with water-steel-concrete-Berea, where everything is the interfaces between the water, steel, concrete and Berea are in physical contact.

The plots depicted in FIGS. 12A-12C show significant differences among them in terms of the characteristics of the signal. When the concrete is in good contact with the Berea sandstone, the energy of the waves through the steel dissipates into the Berea and the observed amplitude is rather low (as shown in FIG. 12C). When there is a detachment or gap between concrete and Berea, the signal level is higher (as shown in FIGS. 12A and 12B).

The second set of plots on the right which represent the amplitude of the signal vs. the frequency shows the frequency content of the received signal. Higher frequencies are damped out when the concrete and the Berea are in good contact (as shown in FIG. 12C). In addition, as can be noted in FIG. 12B, the presence of water between the concrete and Berea confines the energy to earlier times and the frequency content is also narrowed. As shown in FIG. 12A, when the concrete is in good contact with Berea, the signal spreads out in time with the main arrival delayed significantly. The differences between the various scenarios can be readily seen in these plots. The simulated data shows that the described measurement method or system can be used effectively for cement evaluation around a borehole casing.

FIGS. 12A-12C above shows the frequency content of the propagated signal under various conditions of borehole casing integrity in reference to the concrete and the Berea rock formation behind it. Therefore, one cannot see in these figures which frequencies are propagating at what strength at different times. Another way to view the information presented in FIGS. 12A-12C can be based on a joint time-frequency analysis of the data using a short-time Fourier transform (STFT) approach. This provides the frequency content of the signal as a function of time and thus allows one to see the frequencies that are prominent at certain times during the propagation. Hence, the STFT analysis of the data enhances the information provided by FIGS. 12A-12C and introduces a powerful analysis approach.

Figure 13A:
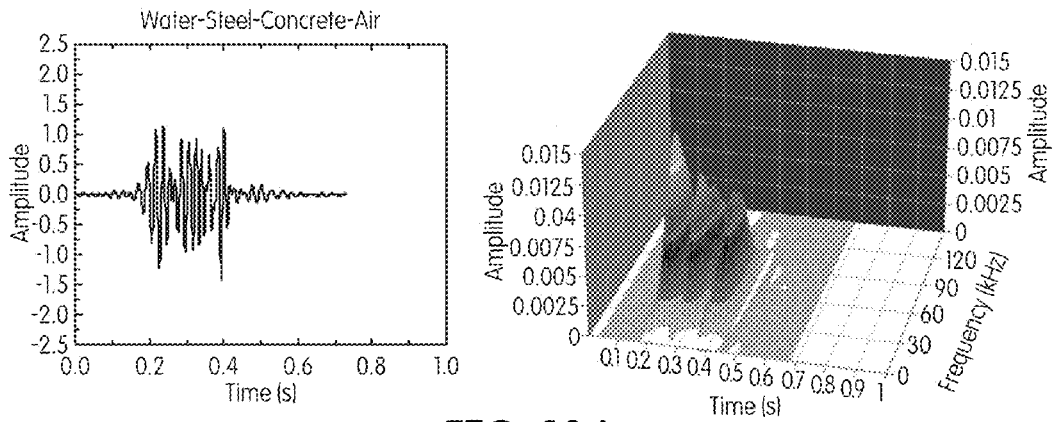
FIGS. 13A-13C shows simulated frequency chirp propagation data along with the time-frequency analysis of the same data, according to embodiments of the present invention.
Figure 13B:
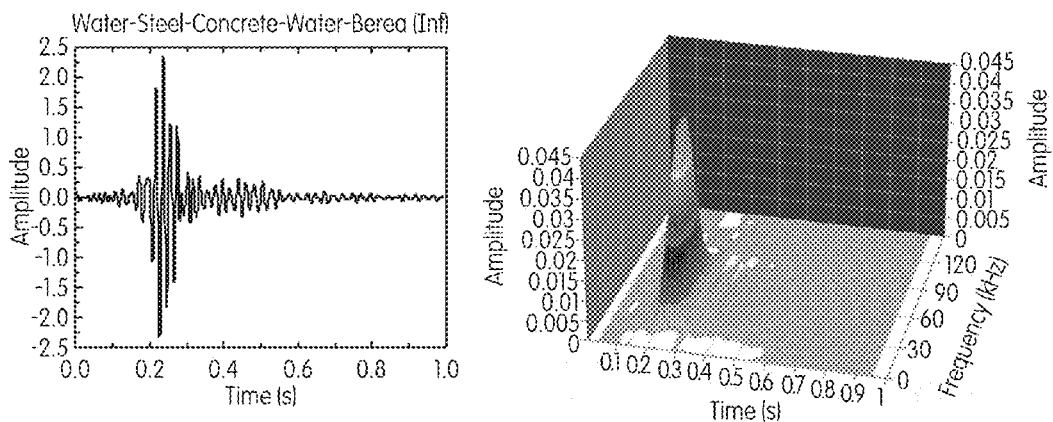
Figure 13C:
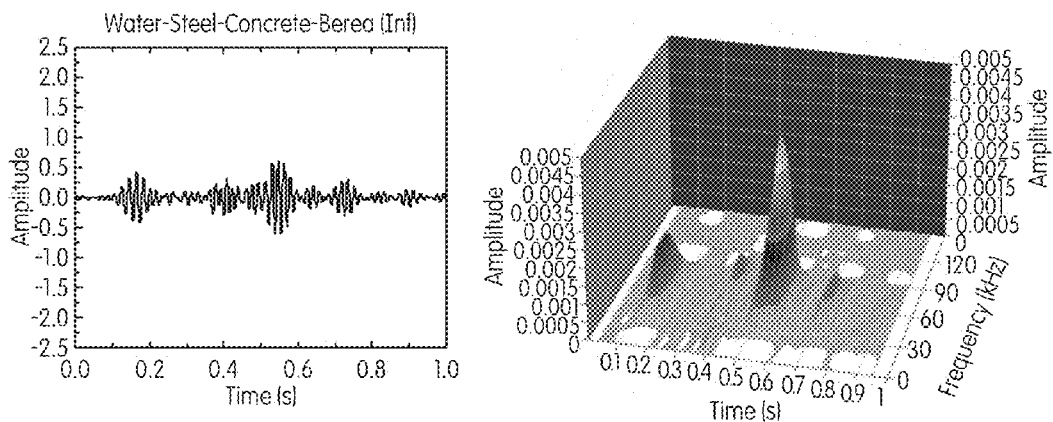

FIGS. 13A-13C show the original simulated frequency chirp propagation data along with the time-frequency analysis of the same data. The plots on the right represent the 3D time-frequency information for each of the situations discussed above with reference to FIGS. 12A-12C, respectively. The x-axis corresponds to the time, the y-axis corresponds to the frequency, and the z-axis or vertical axis corresponds to the amplitude. In FIG. 13A, as shown in the 3D plot, where the concrete is detached from the rest of the system and does not see the rock formation, the energy in the waves propagate through at three different velocities and this gives rise to the three peaks at 0.1 second time interval. It also noted that the wave also arrives relatively quickly, after 0.1 second. In FIG. 13B, as shown in the 3D plot, the situation is that there is a 1 mm gap filled with water between the cement and the rock formation. The propagation characteristics of the acoustic wave are completely different from the propagation characteristics of the acoustic wave shown in FIG. 13A. Indeed, all the energy seems to be bunched together and propagates relatively quickly through the casing and the cement and the propagation is not influenced by the rock formation as if the two parts are isolated. FIG. 13C depicts the situation where all the layers are tightly coupled (steel casing, cement and the rock formation). As shown in the 3D plot in FIG. 13C, the presence of the rock formation has a strong loading influence on the wave propagation and the wave propagation is delayed significantly and the main energy peak arrives with a delay of almost 0.5 second. These three examples show how the various detachments or coupling between the layers can be detected by this type of analysis and measurements.

In addition, by providing azimuthal resolution in borehole acoustic measurements, rock characterization can be improved and thus improve production engineering systems. Furthermore, by proving azimuthal resolution in borehole acoustic measurement, the integrity of the borehole can be evaluated and thus improve the overall drilling safety. In addition, azimuthal resolution in borehole measurements can allow measure a stress surrounding the borehole and as a result improve borehole completion methodology.

Furthermore, the borehole acoustic measurement system and method described can also be used for imaging the rock formation, indeed, the present measurement system and method can fill a measurement gap between conventional sonic tools that investigate less than a foot (approximately 33 cm) from the borehole with relatively a good vertical resolution and conventional long range sonic image tools such as borehole acoustic reflection survey (BARS), from Schlumberger corporation, which investigate rock formation at tens of feet from the borehole but with lower vertical resolution and limited azimuthal resolution. For example the present acoustic measurement method and system may be utilized in various applications including:

1. 3D imaging of reservoir layers, stratigraphy, fractures, faults, vugs (up to few feet such as 10 feet from the borehole) with full azimuth resolution.

2. Measurement of compressional velocity Vp and shear velocity Vs of the rock formation with full azimuth determination.

3. 3D analysis of geo-mechanical properties around boreholes from analysis of refraction waves and Lamb waves to improve characterization of the invasion zone and any borehole damage.

4. 3D imaging of velocity of rock formation near the borehole using refraction analysis.

5. 3D mapping of fractures from reflections of linear arrivals 6. 3D mapping of permeability and production skin of reservoirs.

7. Focusing the acoustic beam with a phase-code Gaussian pulses in the lower frequency range, e.g., between about 10 kHz and about 30 kHz for deeper penetration into the rock formation while discriminating against background noise.

For example, in one embodiment, measurement of the compressional and/or shear velocity of the rock formation in the vicinity of the borehole at a plurality of azimuthal angles using the above described measurement system can provide valuable information on the stress around the borehole hence allowing determining or predicting potential fracture position and/or fracture propagation with the rock formation in the vicinity of the borehole. It is known that formations having relatively larger velocity variations are either relatively less consolidated, or the stress in the formation is large. In both situations, this may provide an indication as to the likelihood of borehole collapsing. The acoustic measurement system described in the above paragraphs can provide information on the velocities as a function of azimuthal angle and/or elevation angle within the rock formation around the borehole. Using the velocity as a function of azimuthal angle and or elevation angle can in turn provide the azimuthal and/or inclination angle of various stress areas and/or fractures, faults, etc., and thus can ultimately provide information on the anisotropy of the earth stress field around the borehole. In addition, the position of a fracture or fault can be mapped in 3 dimensions (3D mapping) using the data acquired as a function of azimuthal and elevation angle.

The above described measurement system and method can also be used in mapping fluid permeability of subsurface formations such as sub-surfaces penetrated by a borehole including permeability due to fractures in the rock formation. For example, this can be performed by measuring velocities (compression velocity or shear velocity or surface waves or any combination of the velocities cited) at various points within the rock formation around the borehole. Based on the measured velocity, the permeability can be extracted using various known models.

In one embodiment, the method or methods described above can be implemented as a series of instructions which can be executed by a computer. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Figure 15:
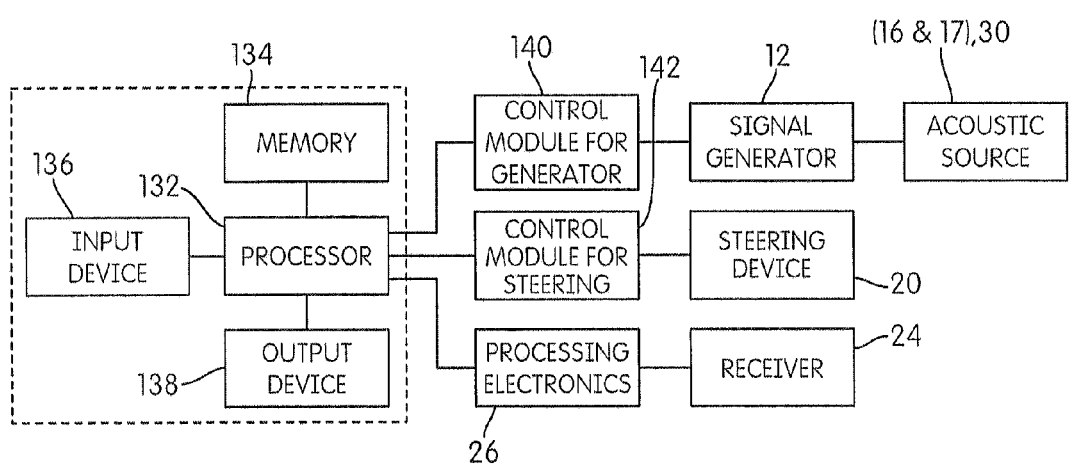
FIG. 15 is a schematic diagram representing a computer system for implementing the method, according to an embodiment of the present invention.

FIG. 15 is a schematic diagram representing a computer system 130 for implementing the methods, according to an embodiment of the present invention. As shown in FIG. 15, computer system 130 comprises a processor (e.g., one or more processors) 132 and a memory 134 in communication with the processor 132. The computer system 130 may further include an input device 136 for inputting data (such as keyboard, a mouse or the like) and an output device 138 such as a display device for displaying results of the computation. The computer system 130 may be configured to control various modules including a control module 140 to control the signal generator 12, a control module 142 to control the steering of the mirror 20, and acquisition electronics 26 for acquiring the measurement data. The measurement data can be stored in a storage device (e.g., a flash drive) for latter visualization or processing, etc.

In one embodiment, there is provided a system for investigating structure near a borehole. The system includes an acoustic source configured to generate an acoustic wave and to direct the acoustic wave at one or more azimuthal angles towards a desired location in a vicinity of a borehole. The system further includes one or more receivers configured to receive an acoustic signal, the acoustic signal originating from a reflection or a refraction of the acoustic wave by a material at the desired location. The system also includes a processor configured to perform data processing on the received signal to analyze the received acoustic signal to characterize features of the material around the borehole.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. An acoustic source for generating an acoustic beam comprising:
    a housing;
    a plurality of spaced apart piezo-electric layers disposed within the housing; and
    a non-linear medium filling between the plurality of piezo-electric layers,
    wherein each of the plurality of piezoelectric layers is configured to generate an acoustic wave, and
    wherein the non-linear medium and the plurality of piezo-electric layers have a matching impedance so as to enhance a transmission of the acoustic wave generated by each of plurality of layers through the remaining plurality of layers.

2. The acoustic source according to claim 1, wherein the housing has a cylindrical configuration and the plurality of piezo-electric layers are spaced apart along a length of the cylindrical configuration.

3. The acoustic source according to claim 2, wherein the cylindrical configuration has a circular base or a polygonal base.

4. The acoustic source according to claim 1, wherein the non-linear medium comprises a fluid.

5. The acoustic source according to claim 4, wherein the fluid comprises water.

6. The acoustic source according to claim 1, wherein the piezo-electric layer comprises a polyvinylidene difluoride (PVDF) film.

7. The acoustic source according to claim 1, further comprising an electrical generator configured to electrically excite at least one piezo-electric layer in the plurality of piezo-electric layers to generate an acoustic wave pulse.

8. The acoustic source according to claim 1, further comprising an electrical generator configured to electrically excite the plurality of piezo-electric films to generate a plurality of acoustic wave pulses that are separated in time to form a train of acoustic wave pulses.

9. The acoustic source according to claim 8, wherein the plurality of time separated acoustic wave pulses are timed so as to be summed to generate an acoustic beam with a power substantially equal to a sum of powers of individual acoustic wave pulses at an output of the acoustic source.

10. The acoustic source according to claim 1, further comprising an acoustic absorber material disposed at a first end of the housing and a plate disposed at a second end of the housing opposite the first end, the plate being selected from a material that substantially transmits the acoustic wave at a desired acoustic wavelength range.

11. The acoustic source according to claim 10, wherein a lateral wall of the housing is layered with acoustic insulation to prevent the acoustic wave from reflecting from the lateral wall.

12. The acoustic source according to claim 10, wherein the plate is configured to collimate the acoustic wave to obtain an acoustic beam or focus the acoustic wave.

13. The acoustic source according to claim 1, wherein the piezo-electric layers are equally spaced apart within the housing.

14. The acoustic source according to claim 1, wherein the housing , the plurality of piezo-electric layers and the non-linear medium are configured to generate an acoustic beam.

15. The acoustic source according to claim 1, wherein a frequency of the acoustic wave is in a range between approximately 15 kHz and approximately 120 kHz.

* * * * *